US011429604B2

(12) United States Patent
Chavan et al.

(10) Patent No.: US 11,429,604 B2
(45) Date of Patent: Aug. 30, 2022

(54) TECHNIQUES OF HETEROGENEOUS HARDWARE EXECUTION FOR SQL ANALYTIC QUERIES FOR HIGH VOLUME DATA PROCESSING

(71) Applicant: Oracle International Corporation, Redwood Shores, CA (US)

(72) Inventors: Shasank Kisan Chavan, Menlo Park, CA (US); Garret F. Swart, Palo Alto, CA (US); Weiwei Gong, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 121 days.

(21) Appl. No.: 17/015,580

(22) Filed: Sep. 9, 2020

(65) Prior Publication Data
US 2021/0073226 A1    Mar. 11, 2021

Related U.S. Application Data

(60) Provisional application No. 62/898,460, filed on Sep. 10, 2019.

(51) Int. Cl.
*G06F 16/2453* (2019.01)
*G06N 20/00* (2019.01)
(Continued)

(52) U.S. Cl.
CPC .. *G06F 16/24537* (2019.01); *G06F 16/24542* (2019.01); *G06F 16/9024* (2019.01); *G06N 20/00* (2019.01); *G06N 5/04* (2013.01)

(58) Field of Classification Search
CPC ........ G06F 16/24532; G06F 16/24537; G06F 16/24542; G06F 16/24553; G06F 16/24569; G06F 16/9024
See application file for complete search history.

(56) References Cited

U.S. PATENT DOCUMENTS 6,609,131 B1   8/2003 Zait
6,678,674 B1   1/2004 Saeki
(Continued)

OTHER PUBLICATIONS

Stavros Harizopoulos et al., "Qpipe", SIGMOD, dated 2005, Proceedings of the ACM SIGMOD International Conference on Management of Data, dated Jun. 2005, pp. 383-394.
(Continued)

*Primary Examiner* — Richard L Bowen
(74) *Attorney, Agent, or Firm* — Hickman Becker Bingham Ledesma LLP; Brian N. Miller

(57) ABSTRACT

The present invention relates to optimized access of a database. Herein are techniques to accelerate execution of any combination of ad hoc query, heterogenous hardware, and fluctuating workload. In an embodiment, a computer receives a data access request for data tuples and compiles the data access request into relational operators. A particular implementation of a particular relational operator is dynamically selected from multiple interchangeable implementations. Each interchangeable implementation contains respective physical operators. A particular hardware operator for a particular physical operator is selected from multiple interchangeable hardware operators that include: a first hardware operator that executes on first processing hardware, and a second hardware operator that executes on second processing hardware that is functionally different from the first processing hardware. A response to the data access request is generated based on: the data tuples, the particular implementation of the particular relational operator, and the particular hardware operator.

19 Claims, 11 Drawing Sheets

(51) Int. Cl.
*G06F 16/901* (2019.01)
*G06N 5/04* (2006.01)

(56) References Cited

U.S. PATENT DOCUMENTS

| | | | |
|---|---|---|---|
| 6,954,776 | B1 | 10/2005 | Cruanes |
| 7,020,661 | B1 | 3/2006 | Cruanes |
| 8,037,096 | B2 | 10/2011 | Champion et al. |
| 8,458,680 | B2 | 6/2013 | Crutchfield et al. |
| 9,195,712 | B2 | 11/2015 | Freedman et al. |
| 9,384,244 | B1 * | 7/2016 | Garg .................... G06F 16/951 |
| 10,067,954 | B2 | 9/2018 | Kociubes |
| 10,409,560 | B1 | 9/2019 | Bebee |
| 2002/0194157 | A1 | 12/2002 | Zait |
| 2005/0131879 | A1 | 6/2005 | Ghosh |
| 2009/0100089 | A1 | 4/2009 | Eadon |
| 2009/0119247 | A1 | 5/2009 | Bellamkonda |
| 2010/0235347 | A1 | 9/2010 | Chaudhuri |
| 2011/0047144 | A1 | 2/2011 | Han |
| 2011/0137890 | A1 | 6/2011 | Bestgen |
| 2011/0258179 | A1 * | 10/2011 | Weissman ......... G06F 16/24578 707/713 |
| 2012/0016641 | A1 | 1/2012 | Raffa et al. |
| 2013/0117255 | A1 | 5/2013 | Liu |
| 2013/0275365 | A1 | 10/2013 | Wang |
| 2014/0317159 | A1 | 10/2014 | Dhavale |
| 2015/0234894 | A1 * | 8/2015 | Dageville ............. G06F 16/148 707/718 |
| 2015/0242487 | A1 | 8/2015 | Varakin et al. |
| 2016/0034486 | A1 | 2/2016 | Dageville |
| 2016/0350375 | A1 | 12/2016 | Das et al. |
| 2017/0046391 | A1 * | 2/2017 | Pestana ................... G06F 16/28 |
| 2018/0052708 | A1 | 2/2018 | Ganesan et al. |
| 2018/0075105 | A1 | 3/2018 | Chavan et al. |
| 2018/0081939 | A1 | 3/2018 | Hopeman |
| 2021/0311943 | A1 * | 10/2021 | Kondiles ............. G06F 11/3006 |
| 2022/0004556 | A1 * | 1/2022 | Arnold ................. G06F 16/242 |

OTHER PUBLICATIONS

Neumann et al., "Generating optimal DAG-Structured Query Evaluation Plans", Berlin, DE, vol. 24, No. 3, dated Mar. 31, 2009, pp. 103-117.
Dursun et al., "A Morsel-Driven Query Execution Engine for Heterogeneous Multicores" Proceedings of the VLDB Endowment, vol. 12, No. 12, dated Aug. 1, 2019, pp. 2218-2229.
Hopeman, U.S. Appl. No. 15/268,521, filed Sep. 16, 2016, Office Action, dated Mar. 8, 2019.
Hopeman, U.S. Appl. No. 15/268,521, filed Sep. 16, 2016, Notice of Allowance, dated Sep. 18, 2019.
Hopeman, U.S. Appl. No. 15/268,521, filed Sep. 16, 2016, Interview Summary, dated Jun. 13, 2019.
Das, U.S. Appl. No. 14/806,601, filed Jul. 22, 2015, Office Action, dated Nov. 3, 2017.
Das, U.S. Appl. No. 14/806,601, filed Jul. 22, 2015, Notice of Allowance, dated Apr. 5, 2018.
Wang, Wendy, et al., "Investigating Memory Optimization of Hash-Index for Next Generation Sequencing on Multi-Core Architecture", 2012 IEEE 26th IP&DPSW, pp. 665-674, downloaded May 13, 2021, 10 pgs.
Zhou et al., "Implementing Database Operations Using SIMD Instructions", ACM SIGMOD '2002 Jun. 4-6, 2002 Madison, Wisconsin, USA, 12 pages.
Wu et al., "Red Fox: An Execution Environment for Relational Query Processing on GPUs", CGO '14, Feb. 15-19, 2014, Orlando, FL, USA, 11 pages.
Neumann et al., "Generating optimal DAG-structured query evaluation plans", CSRD (2009) 24:, dated Mar. 31, 2009, 15 pages.
Moerkotte, Guido, "Building Query Compilers", dated Mar. 5, 2019, Chapter 2 and sections 4.6-4.8, 4.12, and 7.3, 714 pages.
Modern SQL, "The Three-Valued Logic of SQL", dated Jan. 19, 2020, 12 pages.
Liu et al., "ad-heap: an Efficient Heap Data Structure for Asymmetric Multicore Processors", dated Mar. 1, 2014, 52 pages.
Liu et al., "ad-heap: an Efficient Heap Data Structure for Asymmetric Multicore Processors", GPGPU-7, dated Mar. 1, 2014, Salt Lake City, UT, USA, 11 pages.
Graefe, Goetz, "Query Evaluation Techniques for Large Databases", ACM Computing Surveys 25(2), only sections 10.2-10.3 and 12.4 dated Nov. 10, 1993, 168 pages.
Eich et al., "Faster Plan Generation through Consideration of Functional Dependencies and Keys", Proceedings of the VLDB Endowment, vol. 9, No. 10, dated 2016, 12 pages.

* cited by examiner

2 Segmented Gathers

TECHNIQUES OF HETEROGENEOUS HARDWARE EXECUTION FOR SQL ANALYTIC QUERIES FOR HIGH VOLUME DATA PROCESSING

BENEFIT CLAIM

This application claims the benefit of Provisional Appln. 62/898,460, filed Sep. 10, 2019, the entire contents of which are hereby incorporated by reference as if fully set forth herein, under 35 U.S.C. § 119(e).

FIELD OF THE INVENTION

The present invention relates to optimized access of a database. Herein are techniques to accelerate execution of any combination of ad hoc query, heterogenous hardware, and fluctuating workload.

BACKGROUND

In a relational database system, queries may be defined using relational algebra, and query plans may be compiled and represented as a binary tree consisting of relational operators. Subsequently in the execution phase, database data are traversed through different relational operators to compute a result. At runtime, one row of a row set such as a relational table is individually fetched at a time from a child relational operator in the tree to return to a parent relational operator. In some cases, rows are transferred as a batch of a few hundred rows between relational operators.

A relational operator is a coarse-grained unit of logic that should be prepared to handle hundreds of millions of subcases to support all potential use cases that are combinatorically possible due to relational schema variations and data value distributions. The decision of which of many control flow branches to take for a particular row of millions of rows is made partially at compilation time with a static plan optimization part and partially at runtime with an ad-hoc data-driven part. A technical problem is that the algorithm of a relational operator must fit all use cases, including use cases that cannot occur for a current query with current data and use cases that will never occur in a given database server. With or without batching, the relational operator tree approach can cause somewhat inefficient data processing for high volume data.

A state of the art database system may support structured query language (SQL) analytic queries on big data by vertically partitioning the data such as with a columnar database that may or may not encode and compress a column of a relational table. Thus, thousands or millions of rows of data of the same column are stored together and are ready to benefit from vectorized processing. However, the relational operator tree approach in a SQL execution engine only has the columnar uniformly encoded data at the base table scan, from which relational operators of a table scan then eagerly and completely decode and transform columns back to row-major data for analytics. This is at best a retrofit of a legacy row processing model onto modern hardware. Generally, such approaches involve data structures, formats, and algorithms that were designed for computational styles and hardware that are outdated.

DETAILED DESCRIPTION

Figure 1:
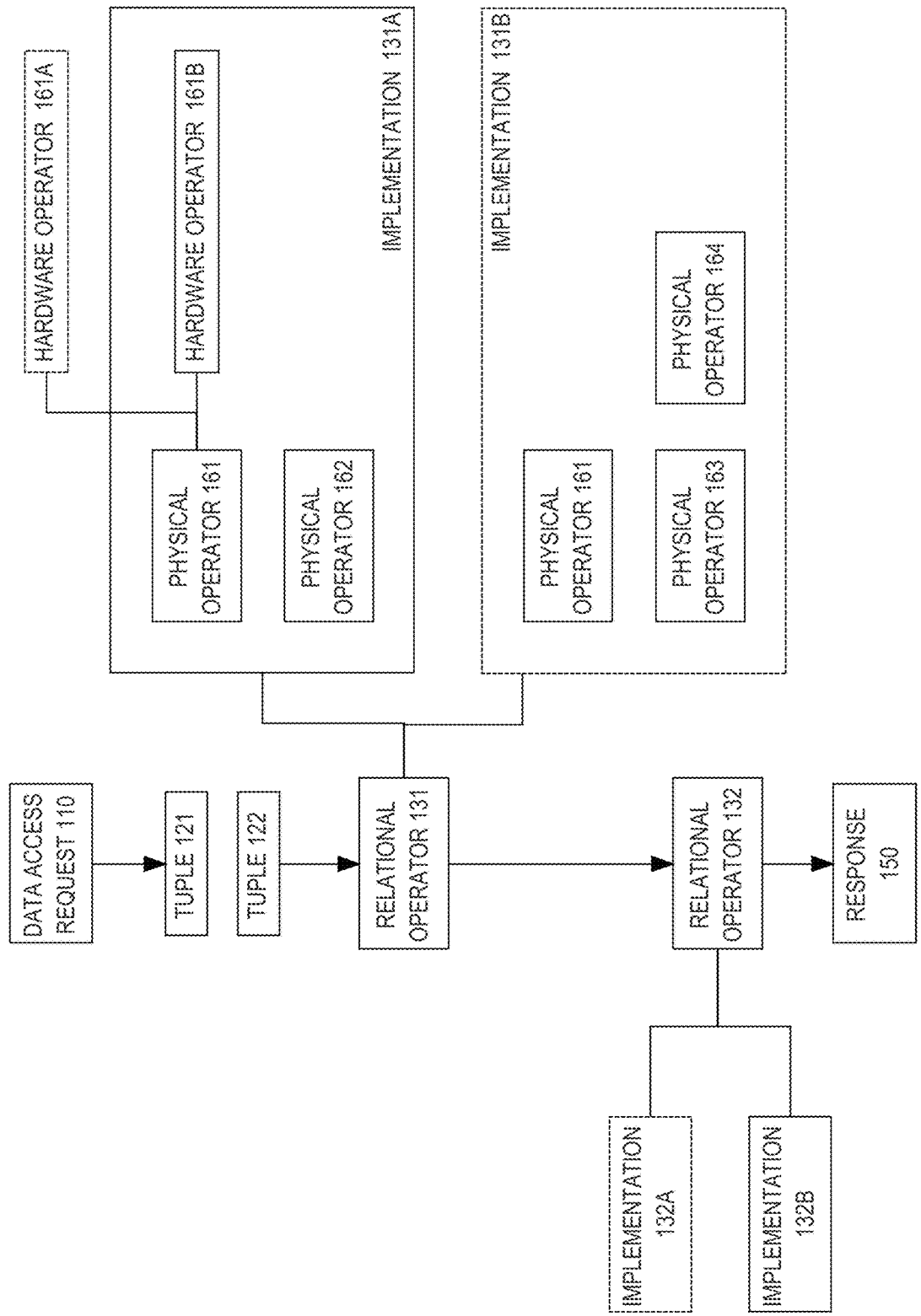
FIG. 1 is a block diagram that depicts an example database management system (DBMS) that dynamically selects, based on available hardware and fluctuating conditions, a specialized implementation from several interchangeable implementations of a same relational operator to be invoked during execution of a database query.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are novel execution techniques for relational queries, including a set of hardware friendly operations, known herein as physical operators, that are finer-grained than known relational operators, but are hardware independent and can accept columnar data for increased throughput. Each relational operator can be represented as a dataflow network of physical operators. Each physical operator represents a smallest beneficial unit of work to be readily mapped to hardware for processing as described herein.

Important characteristics of physical operators include the following design dimensions that affect query planning and optimization as discussed herein.

Based on how to schedule physical operators, there are four types: blocking, pipelining, caching, and fusible;

Based on space consumption, some operators increase memory demand such as when the output size is much larger than input, and some operators instead release memory for reclamation such as by discarding intermediate data no longer needed;

Based on predominating resource demand of the physical operator such as compute bounded versus bus/memory bandwidth bounded.

Optimization entails tuning the above dimensions to balance the above concerns based on heterogenous hardware present and dynamic conditions such as fluctuating workload and data value distribution. Such optimization and how approaches herein decompose each relational operator fundamentally changes how a database management system (DBMS) processes queries to facilitate increased efficiency and other performance improvements of the DBMS computer itself, including the following benefits.

By decomposing relational operators into physical operators, a query plan is converted into a directed acyclic graph (DAG) that has more finer-grained operators and more dataflow path interconnections between operators. Thus more optimization opportunities are exposed, including opportunities inside and between operators.

Each physical operator is further tuned for each hardware platform by mapping to hardware operators that directly execute on hardware to facilitate sophisticated optimization such as the following artificially intelligent (AI) optimization activities.

Characteristics and metrics are collected offline to model different workload scenarios, and historical data is used to train a machine learning (ML) model for optimal tuning of operator configuration settings such as batch sizes;

At runtime, the ML model observes a current workload and predicts optimal values for configuration settings for each physical operator;

The result of a current run will be used to further train the offline model.

Because a query is first decomposed into physical operators that are smaller units of work, and depending on the properties of interconnected physical operators such as blocking, pipelining, caching, and fusible as discussed herein, there is a huge solution space of possible execution graphs, for which an optimizer/scheduler may be resource-aware such as according to fluctuating conditions and heterogenous kinds, amounts, and capacities of available hardware.

As described herein, awareness of both of fluctuating conditions and diversity of hardware encourages highly opportunistic optimization. Different optimization techniques herein can be used for a same physical operator when executed on different platforms, even during a same execution of a query. The uniformity of the physical operator interface facilitates reusable optimization heuristics, even when a DBMS has heterogenous hardware, thereby encouraging various horizontal and/or pipeline parallelisms such as offloading of operators onto discrepant coprocessors.

For example, known SQL processing is decomposed no further than relational operators. As a result, the entire operator and/or operator tree is purely optimized for the central processing unit (CPU) however the compiler chooses. Finer-grained physical operators herein are individually optimized for heterogenous approaches such as single instruction multiple data (SIMD) instructions and/or coprocessor offloading, especially with columnar data.

For example herein, a join relational operator may be decomposed into a multitude of finer-grained operations such as hashing, building a hash table, building a bloom filter, probing a hash table, and/or gathering fields from a hash table such as for projecting from the hash table. Some of these operations may be further decomposed. For example, the build of a hash table is further decomposed into decoding of join key values, partitioning of rows based on join key values, insertion of a join key value and an accompanying other value into a bucket of the hash table, and handling of overflow. Physical operators for all of those activities may be interconnected for pipeline parallelism and/or horizontal scaling such as with symmetric multiprocessing (SMP). Finer-grained operators provide more decomposition, more decoupling, and thus more asynchrony for load balancing and offloading that increase throughput.

In an embodiment, a computer receives a data access request for data tuples and compiles the data access request into relational operators. A particular implementation of a particular relational operator is dynamically selected from multiple interchangeable implementations. Each interchangeable implementation contains respective physical operators. A particular hardware operator for a particular physical operator is selected from multiple interchangeable hardware operators that include: a first hardware operator that executes on first processing hardware, and a second hardware operator that executes on second processing hardware that is functionally different from the first processing hardware. A response to the data access request is generated based on: the data tuples, the particular implementation of the particular relational operator, and the particular hardware operator.

1.0 Example Computer

FIG. 1 is a block diagram that depicts an example database management system (DBMS) 100, in an embodiment. DBMS 100 dynamically selects, based on available hardware and fluctuating conditions, a specialized implementation from several interchangeable implementations of a same relational operator to be invoked during execution of a database query. DBMS 100 may be hosted on one or more computers such as a rack server such as a blade, a personal computer, a mainframe, a virtual computer, or other computing device. When hosted by multiple computers, the computers are interconnected by a communication network.

In various embodiments, DBMS 100 stores and provides access to a bulk datastore such as a relational database, a graph database, a NoSQL database, a column datastore, a tuple datastore such as a resource description framework (RDF) triplestore, a key value datastore, or a document datastore such as for documents that contain JavaScript object notation (JSON) or extensible markup language (XML). In any case, the datastore may be managed by software such as an application or middleware such as DBMS 100. Data stored in the datastore may reside in volatile and/or nonvolatile storage.

In this example, data is organized as multi-field tuples 121-122. In this example, fields may have a tabular arrangement that is logical and/or physical such that fields are arranged as one record per row and one field per column. For example, tuples 121-122 may each be a row in a relational table, a column family, or an internal row set such as an intermediate result.

In operation, DBMS 100 receives or generates data access request 110 to read and/or write data in the datastore. In embodiments, data access request 110 is expressed as data manipulation language (DML) such as a create read update delete (CRUD) statement or query by example (QBE). For example, data access request 110 may be a structured query language (SQL) DML statement such as a query. In an embodiment, data access request 110 is received through open database connectivity (ODBC).

DBMS 100 compiles or otherwise interprets data access request 110 based on generalized operators that respectively inspect, rearrange, modify, transfer, or otherwise process bulk data such as tuples 121-122 or derived data such as intermediate results such as follows. In an embodiment, DBMS 100 compiles data access request 110 into a query plan that is arranged as a logical tree (not shown) of relational operators 131-132.

In an embodiment, the logical tree is derived by decorating or otherwise transforming a parse tree that is generated from data access request 110. In a decorating embodiment, each node of the parse tree may be bound to a respective relational operator. In an embodiment, data access request 110 is executed by interpreting or otherwise executing the generated query plan.

In an embodiment, relational operators 131-132 are generalized logical operators that more or less directly correlate with operations specified by data access request 110. For example, relational operators 131-132 may be relational algebra operators. For example, relational operator 131 may represent a relational table scan or a relational join of two relational tables.

According to techniques herein, relational operators 131-132 are generalized logical operators that each is composed of one or more physical operators, that are finer-grained than relational algebra. For example, relational operator 131 contains physical operators 161-162 that are used in combination to provide one relational algebra operation such as a join. For example, a relational join may be decomposed into physical operator 161 that is a build operation and physical operator 162 that is a probe operation as discussed later herein.

In other words, a compiled query plan based on multiple physical operators for each of relational operators 131-132 may have more nodes and be more complicated than a relational algebra parse tree. For example as explained later herein, a query plan based on the many physical operators of relational operators 131-132 may be a directed acyclic graph (DAG) instead of a tree. Intricacies arising from more, finer-grained, and more interconnected operators than a relational algebra parse tree presents more opportunities for query plan optimization as discussed later herein. For example, more efficient dataflow may be based on copying less data and/or fusing operators as discussed later herein.

Relational operators 131-132 are generalized and may be somewhat abstract such that provision of relational operators 131-132 may need or benefit from specialized implementations such as to exploit special hardware such as a graphical processing unit (GPU) for vector acceleration. For example, relational operator 131 may be provisioned with either of interchangeable implementations 131A-B that may be differently specialized for different conditions such as: a) fluctuating workload of DBMS 100, b) available hardware, and/or c) schematic details and/or data value distributions of tuples 121-122.

Each of relational operators 131-132 is composed of same or different amounts of physical operator(s). None, some, or all of the physical operators of one relational operator may be the same as physical operators of another relational operator. For example, both of implementations 131A-B contain physical operator 161, which means physical operator 161 has two occurrences or instances that may be same or somewhat differently configured.

An important configuration of a physical operator is which hardware operator will execute for the physical operator. That is, each instance of a same physical operator has one respective hardware operator, and different instances of the same physical operator may have same or different hardware operators. For example, both shown instances of physical operator 161 may have respective instances of same hardware operator 161B. Alternatively, one instance of physical operator 161 may have hardware operator 161B as shown, and the other instance of physical operator 161 may instead have hardware operator 161A.

Unlike a relational operator or a physical operator, both of which are processing generalizations, a hardware operator actually is executable, but only on particular hardware. For example, hardware operator 161B may contain machine instructions that can only run on central processing units (CPUs) that support a particular instruction set architecture (ISA). For example, hardware operators 161A-B may respectively execute on a GPU and a CPU. If DBMS 100 lacks a GPU, then hardware operator 161A would be unavailable in that case such that DBMS 100 would not use hardware operator 161A for any physical operator and would not generate or otherwise select any implementation that included hardware operator 161A.

Query plan optimization herein includes dynamic selection, based on fluctuating conditions, of a specialized implementation from several interchangeable implementations of a same relational operator. For example, DBMS 100 should dynamically select whichever of implementations 131A-B would be most efficient for relational operator 131. In embodiments discussed later herein, such dynamic selection is cost based according to various computer resources such as processing hardware, processing time, and/or memory space.

Relational operator 132 also has interchangeable implementations 132A-B. Accordingly and as discussed later herein: a) the more relational operators occur in an initial query plan, b) the more interchangeable implementations does each operator have, and c) the more processing hardware alternatives are available, then the more comparable query plans are possible due to combinatorics. For example, techniques herein may facilitate thousands or millions of distinct yet equivalent query plans for same data access request 110.

As explained later herein, costing may assist (a) avoiding generation and/or consideration of inefficient query plans and/or (b) selection of a best plan between many candidate query plans. Implementations 131B and 132A and hardware operator 161A are shown with dashes to indicate that they are not generated nor otherwise selected in this example. That is in this example, implementations 131B and 132A, physical operators 161-162, and hardware operator 161B are selected and used for the optimized query plan that actually executes data access request 110.

All relational operators, their implementations such as 131A-B and 132A-B, physical operators, and hardware operators are reusable either directly or by instantiation such as from a template and thus may be incorporated into different execution plans of same or different queries. For example, DBMS 100 may have a library of predefined hardware operators, predefined physical operators, declarations of which hardware operators may be used for which physical operators, and/or relational operators and their implementations such as 131A-B and 132A-B. In an embodiment, predefined relational operator implementations such as 131A-B and 132A-B include predefined bindings of one hardware operator to each instance of a physical operator.

An embodiment may have templatized predefined relational operator implementations that contain physical operators but no hardware operators, such that DBMS 100 eagerly or lazily generates precise relational operator implementations such as 131A-B and 132A-B by assigning hardware operators to instances of physical operators. In that way, templatized predefined relational operator implementations and their physical operators are independent of hardware and fully portable such as across discrepant instruction set architectures and processing approaches such as GPU versus CPU.

In other words, such operator components herein readily adapt to new hardware for future-proofing and seamlessly exploit hardware diversity when DBMS 100 has heterogenous hardware such as a mix of GPUs and CPUs. Thus, such operator components herein can use distributed processing for increased processing bandwidth and throughput by horizontal and/or vertical scaling and/or offloading such as pushing down filtration to a storage computer that provides data persistence such as with a smart scan.

Because query planning by DBMS 100 includes dynamic selection, based on fluctuating conditions, of relational operator implementations such as 131A, including dynamic selection of hardware operators, DBMS 100 may load balance. For example, a GPU may usually be a fastest way to execute physical operator 161, but if the GPU is currently too busy, then DBMS 100 may instead use the CPU by instead selecting a relational operator implementation that uses a CPU hardware operator for physical operator 161. For example, relational operator implementations 132A-B may have identical sets of physical operators and differ only by one, some, or all hardware operators.

Indeed, what ultimately distinguishes one relational operator implementation from all other implementations of same and different relational operators is that each relational operator implementation has a distinct set of hardware operators or, at least, a distinct directed acyclic graph of hardware operators. In any case, any of relational operators, their implementations such as 131A-B and 132A-B, physical operators, and hardware operators may accept configuration settings and data inputs to facilitate or tune operator execution.

As discussed later herein, operators are interconnected such as in a dataflow graph such that data such as columnar data flows from a data output of an upstream operator to a data input of a connected downstream operator. Thus, each operator has input(s) and output(s) for data.

Each operator instance also has configuration settings that are set when the operator instance is generated and usually not subsequently adjusted. Topological details such as which upstream operators provide which inputs and which downstream operators receive output may be configuration settings of an operator instance. Additional configuration settings may affect semantics or efficiency of the operator instance. For example, a buffer size may be a configuration setting, and a buffer memory address may be a data input. Thus, even instances of a same operator may be distinguished by their configuration settings, their received data, and their positions within a query plan such as within a DAG of operators.

After query compilation and planning is actual execution of data access request 110. In an embodiment, query planning and optimization may ultimately generate or select a DAG consisting solely of hardware operators that specify all of the activities needed to fully execute data access request 110. For example, instances of relational operators and their implementations such as 131A, although important to query planning, may be discarded or, if predefined, saved for reuse when an optimized DAG of hardware operators is selected for actual execution.

For example, query planning may entail generating a parse tree of relational operators 131-132, a DAG of physical operators, and a DAG of hardware operators. Whereas, actual execution needs only the DAG of hardware operators, which may be discarded or saved for reuse after actual execution of data access request 110. In any case, such optimizing preparation and subsequent execution, including flows of data and control, from data access request 110 and tuples 121-122 to response 150 through hardware operators, are as follows, including an explanation of response 150.

2.0 Example Query Compilation Process

Figure 2:
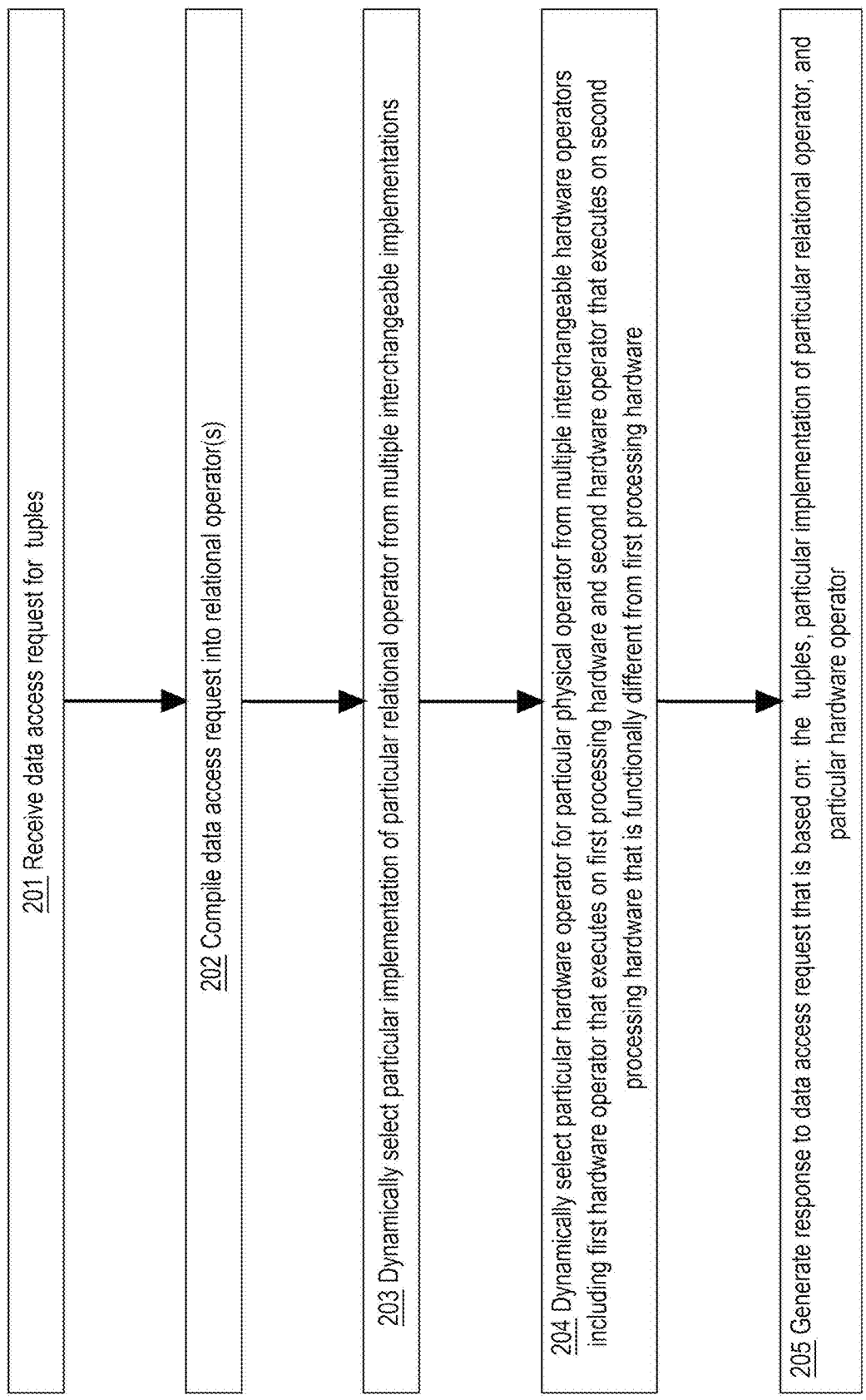
FIG. 2 is a flow diagram that depicts an example query compilation process that dynamically selects, based on available hardware and fluctuating conditions, a specialized implementation from several interchangeable implementations of a same relational operator to be invoked during execution of a database query.

FIG. 2 is a flow diagram that depicts an example query compilation process that DBMS 100 performs to dynamically select, based on fluctuating conditions, a specialized implementation from several interchangeable implementations of a same relational operator to be invoked during execution of a database query.

Step 201 receives data access request 110 for tuples 121-122 such as a SQL query via ODBC as discussed earlier herein.

Step 202 compiles data access request 110 into relational operators 131-132 such as by parsing data access request 110 into a parse tree according to relational algebra as discussed earlier herein.

Step 203 dynamically selects particular implementation 131A of relational operator 131 from multiple interchangeable implementations 131A-B. As discussed earlier herein, implementations 131A-B each contains some of physical operators 161-164 that are independent of hardware architecture. Implementations 131A-B may be predefined and/or templatized as discussed earlier herein. DBMS 100 may dynamically generate or otherwise dynamically select implementation 131A according to fluctuating conditions such as resource availability and/or expected resource consumption of physical operators 161-164 as discussed earlier herein such as by costing.

Step 204 dynamically selects particular hardware operator 161B for particular physical operator 161 from multiple interchangeable hardware operators including first hardware operator 161A that executes on a first processing hardware such as a CPU and second hardware operator 161B that executes on a second processing hardware that is functionally different from the first processing hardware such as a GPU. For example, step 204 may be based on actual hardware inventory, fluctuating hardware workload, and/or hardware allocation quota(s) as discussed later herein. Various embodiments may have various amounts and kinds of hardware processors such as the following example other kinds of hardware.

a single instruction multiple data (SIMD) processor such as explained later herein, a field array programmable gate array (FPGA), a direct access (DAX) coprocessor for nonvolatile random access memory (RAM), and an application specific integrated circuit (ASIC) that contains pipeline parallelism such as explained later herein.

Step 205 generates response 150 to data access request 110 that is based on: the tuples, particular implementation 131A of particular relational operator 131, and particular hardware operator 161B. For example, the DAG of hardware operators in an optimized query plan, as discussed earlier herein, may execute as a dataflow graph that manipulates and transfers relational data, as discussed later herein, to generate response 150. Response 150 is an answer to data access request 110 that may include a final result set such as a row set in columnar or row-major format as discussed later herein. DBMS 100 may send response 150 to a same client that submitted data access request 110 such as by ODBC as discussed earlier herein.

3.0 Example SQL Parse Tree

Figure 3:
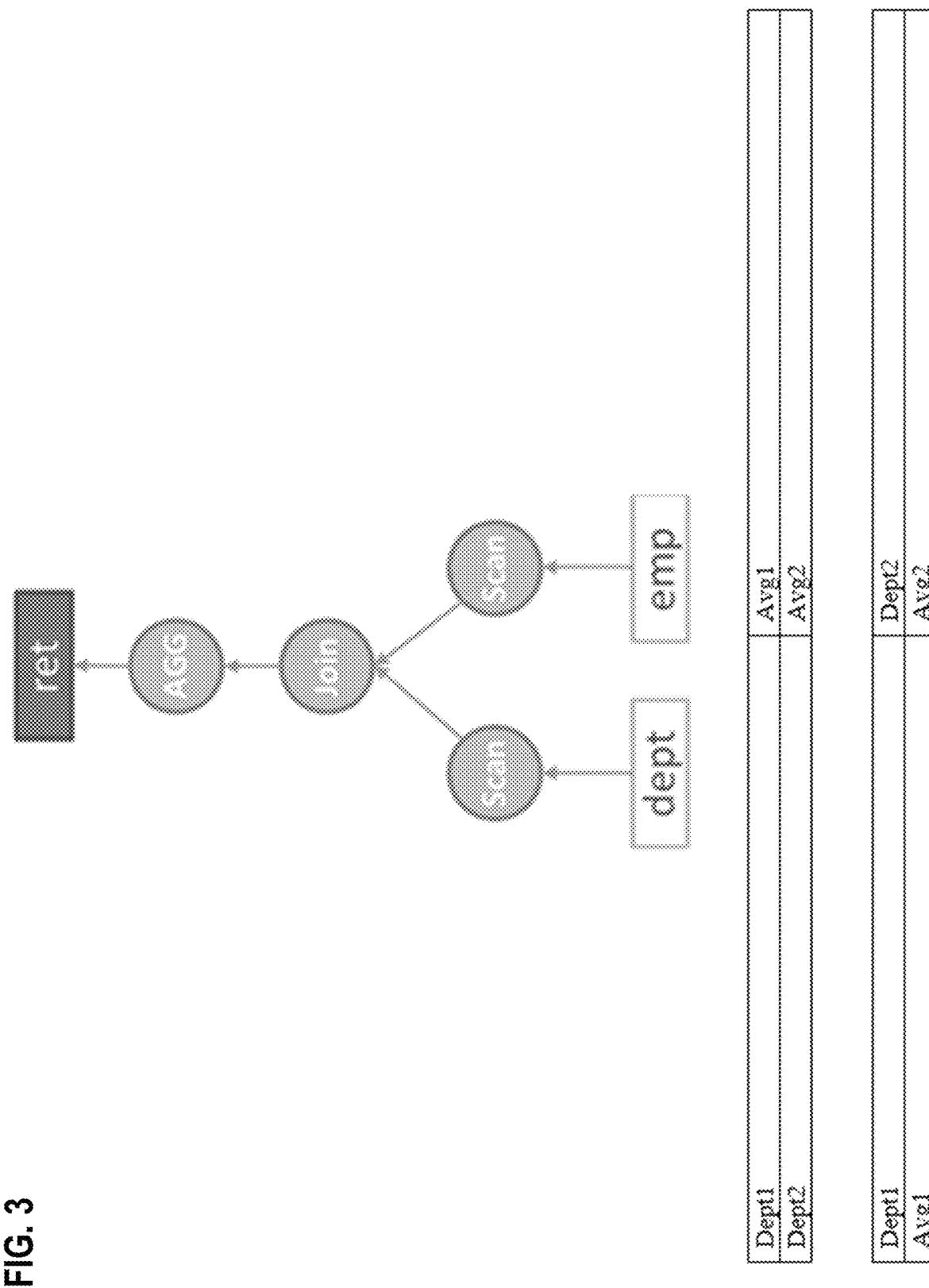
FIG. 3 is a block diagram that depicts, for a same example structured query language (SQL) query, an example relational algebra parse tree and two alternative example result sets.

FIG. 3 is a block diagram that depicts, for a same example structured query language (SQL) query, an example relational algebra parse tree and two alternative example result sets. The example SQL query is:
select dept_name, avg (emp_sal) from emp, dept where dept.dept_id=emp.dept_id;

In the example SQL query, each row of the emp table represents an employee, and each row of the dept table represents a department. The example SQL query calculates an average salary for each department. As shown in the example result sets, the dept table contains dept1-2 that are identifiers, and the example SQL query calculates respective avg1-2 that are numbers.

Each example result set contains two rows and two columns. The top result set is the actual answer for the example SQL query, which may or may not be arranged as desired. Other queries may instead generate, as a final result or an intermediate row set, the bottom result set that is the matrix transpose of the top result set. In other words, both result sets contain the same four values but arranged differently. A detailed physical query plan that is composed of physical operators for a query somewhat similar to the example SQL query and including transposition is as follows.

4.0 Example Transpose Process

Presented later herein for later figures are techniques for various ways of accelerating execution of any combination of ad hoc query, heterogenous hardware, and fluctuating workload. The following transpose operator demonstrates that a physical operator may provide exotic functionality that is hardware independent and can be used within and between relational operators 131-132 of FIG. 1 in special ways. This transpose operator demonstrates that various kinds of physical operators may exceed the vocabulary of relational algebra due to finer granularity and exotic semantics. Other exotic kinds of physical operators are presented later herein.

Transpose is exotic because it is not built into SQL. Known work arounds for transposition usually entail SQL logic that is hard coded by hand for a particular table such as with a pivot operation or with complicated use of a database cursor. A known generic work around that is table independent entails a subquery and dynamically composed SQL, which are expensive.

In any case, known work arounds have query plans that contain multiple relational operations, each of which may contain multiple physical operators according to techniques herein. Whereas the transpose operator achieves same transposition as a single physical operator. Likewise, the transpose operator and its hardware operator better exploit special hardware such as a GPU that accelerates matrix manipulation such as with tabular data. Unlike SQL's pivot operator, the transpose operator does not use a pivot column.

Figure 4:
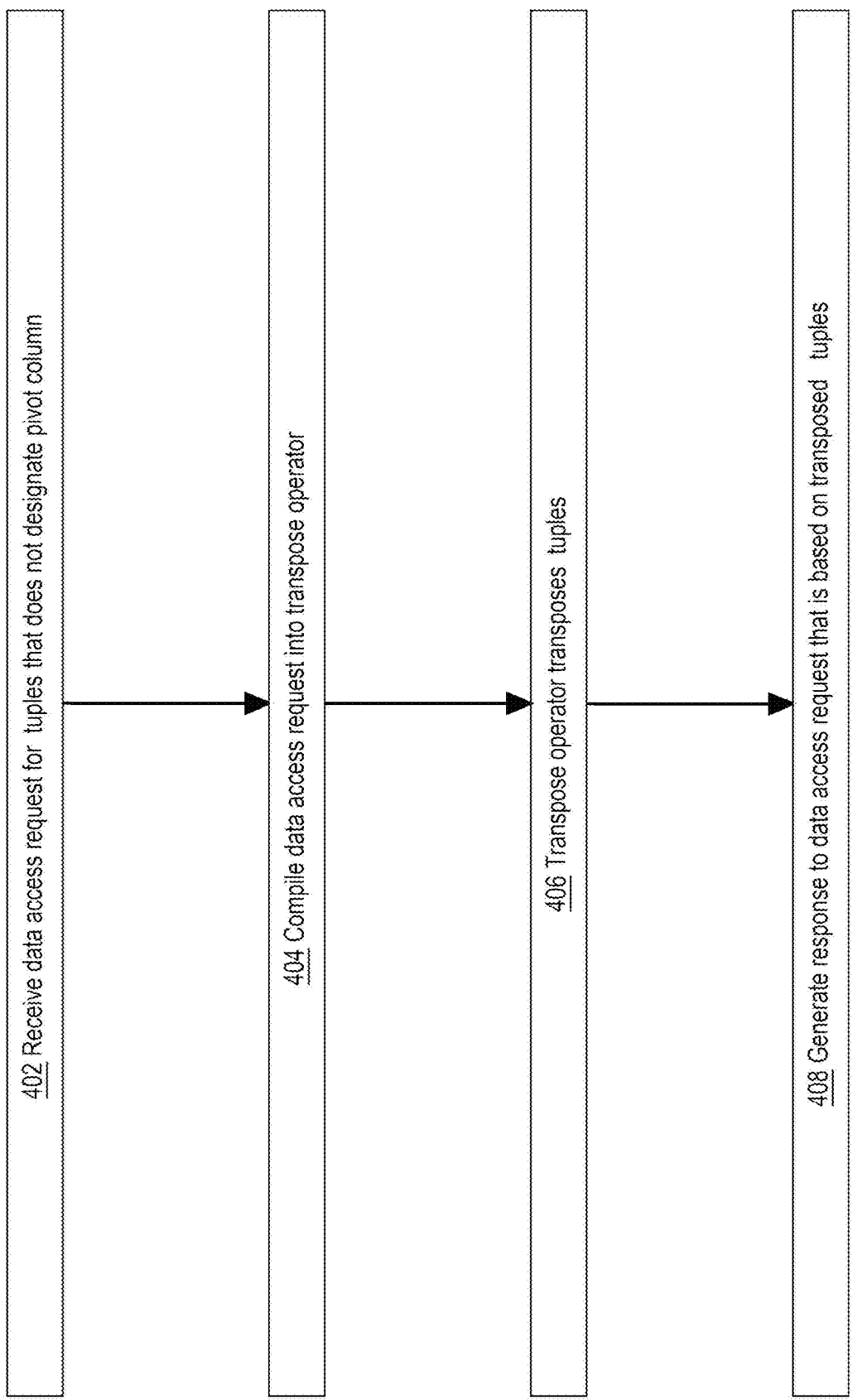
FIG. 4 is a flow diagram that depicts an example query execution by a DBMS that includes an example transpose operator that applies matrix transposition to a relational table or other row set.

FIG. 4 is a flow diagram that depicts an example query execution by DBMS 100 of FIG. 1 that includes an example transpose operator that applies matrix transposition to a relational table or other row set. FIG. 4 is discussed with reference to FIGS. 1 and 3.

Step 402 receives data access request 110 of FIG. 1 such as discussed earlier herein such as a data manipulation language (DML) statement for SQL. As discussed above, data access request 110 does not designate a pivot column.

Step 404 compiles data access request 110 into a query plan of physical operators that includes a transpose operator. Matrix transposition of a relational table or other row set may be expressly specified in data access request 110. Alternatively, such transposition may be implicitly selected based on various dynamic conditions such as: a) conversion between output format of an upstream operator to input format of a downstream operator, b) conversion between an operator format and an input or output file format, c) isolation of particular data in the row set such as when transposition is used in conjunction with horizontal and/or vertical slicing such as discussed later herein, or d) use of a hardware operator that exploits special hardware such as a GPU that needs or benefits from particular formatting of tabular data.

A transpose operator is a physical operator that performs the above transpositions. In an embodiment, a transpose physical operator has a transpose hardware operator that provides matrix acceleration by special hardware such as a GPU. In an embodiment and instead of or in addition to a transpose operator, a rotation operator is a physical operator that logically rotates a row set according to a configuration setting that specifies a positive or negative multiple of quarter turns. Neither transpose operator nor rotate operator uses a pivot column as needed by a SQL pivot.

When the query plan is executed in step 406, the transpose operator transposes the row set. As explained earlier herein, FIG. 3 shows a transposition of a row set that is not a relational table but instead a result set of a join, a group by, and a statistical average, in that ordering. As shown in FIG. 3, the result set before and after transposition are shown as top and bottom row sets that, when compared, reveal that the transpose operator leaves a matrix diagonal unchanged that, in this case, is the diagonal that includes the shown dept1 and avg2 values. In other words, the transpose operator takes the shown top row set as input and emits the shown bottom row set as output.

Step 408 generates response 150 based on the transposition by step 406. For example, response 150 may contain some or all of the bottom row set or otherwise be based on the bottom row set. For example, the shown bottom row set is emitted as output of the transpose operator and may or may not be an intermediate row set that is consumed as input for further processing by a downstream operator.

5.0 Example Dataflow

Figure 5:
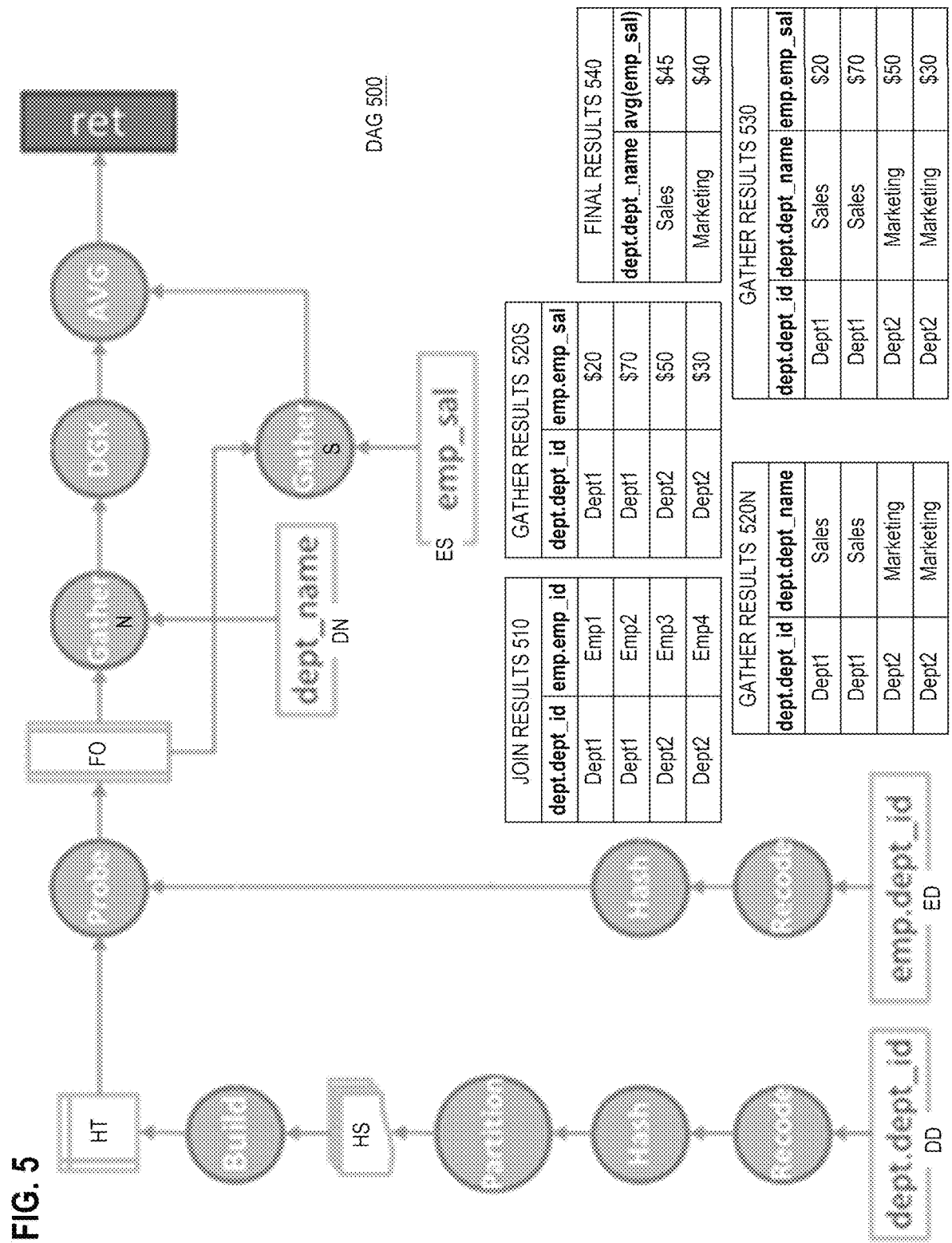
FIG. 5 is a block diagram that depicts, for an example physical plan of a query, an example directed acyclic graph (DAG) of physical operators that are readily portable to discrepant hardware architectures and can be opportunistically offloaded to diverse hardware such as coprocessor(s).

FIG. 5 is a block diagram that depicts, for an example physical plan of a query, an example directed acyclic graph (DAG) 500 of physical operators that are readily portable to discrepant hardware architectures and can be opportunistically offloaded to diverse hardware such as coprocessor(s) as explained later herein. FIG. 5 is discussed with reference to FIG. 3. FIG. 5 shows DAG 500 and various tabular results 510, 520N, 520S, 530, and 540 that are not part of DAG 500 but instead are example data generated at various times by operation of various shown physical operators that are part of DAG 500 as discussed below and later herein.

DAG 500 may logically operate as a dataflow graph. As explained later herein, data flows through the physical operators of DAG 500 and between the physical operators in the direction of the shown arrows that interconnect the physical operators. FIG. 3 shows a parse tree of relational operators that is generated as a high level execution plan for an example query presented earlier herein.

Likewise, DAG 500 may be generated as an intermediate level execution plan from the parse tree of FIG. 3. Visual comparison of FIGS. 3 and 5 reveal that generating an intermediate execution plan from an initial plan entails increased complexity of specification. However, planned semantics are unchanged between both plans. In other words, the execution plans shown in FIGS. 3 and 5 represent a same example query and achieve identical query results.

As explained earlier for FIG. 3, the example query calculates average salary by department, which entails in sequence: a) joining a department table to an employee table, b) grouping join results by department, and c) averaging salaries of the department groups. For demonstrative simplicity, FIG. 3 shows the grouping and averaging combined into single relational operator AGG (aggregation), although a practical embodiment of the parse tree may instead have separate relational operators respectively for grouping and averaging.

DAG 500 is more complex than the parse tree because physical operators are finer grained than relational operators such that one relational operator may be represented by multiple physical operators. Thus, visually recognizing the joining, grouping, and averaging of the example query in DAG 500 may be somewhat less apparent as follows and explained in more detail later herein.

The build physical operator, the probe physical operator, and hash table HT in DAG 500 cooperate to perform the join of the example query. The dense grouping key (DGK) physical operator in DAG 500 performs the grouping of the example query. The average (AVG) physical operator in DAG 500 performs the averaging of the example query. However, DAG 500 contains many more specialized physical operators that cooperate in execution and dataflow for the example query as follows.

Although some file formats such as Apache Parquet can persist some or all columns of a same relational table in a same columnar file, this example persists one column per columnar file. Thus, a table scan physical operator such as shown DD, ED, DN, and ES loads one column. Other table scan operator embodiments may load multiple columns from a same columnar file or may load row-major data.

As explained later herein, each table scan operator originates a separately scanned dataflow path such that some or all table scan operators may execute in parallel. Also as explained later herein, multiple physical operators in a same scanned dataflow path may cooperate as a processing pipeline. For example, table scan operator ED originates a scanned dataflow path that includes downstream a recode operator and a hash operator as shown. The semantics of the shown kinds of physical operators such as recode and hash are exotic as explained later herein.

A dataflow graph, such as DAG 500, can transfer data between operators in ways that a parse tree cannot such as follows. Especially important for topological composition are fan in and fan out for connecting operators. Fan in is the convergence of multiple upstream dataflow paths into a same operator.

In other words, an operator may have multiple inputs, regardless of whether the operator is a relational operator or a physical operator. Thus, the parse tree of FIG. 3 and DAG 500 both show fan in. For example, the probe physical operator in DAG 500 has fan in to accept inputs from multiple upstream physical operators.

Fan out is the distribution of same or different data from one operator to multiple downstream dataflow paths. In other words, a physical operator may have multiple outputs, which a relational operator cannot have. Thus a dataflow graph, such as DAG 500, can transfer data between operators in ways that a parse tree cannot, which includes emitting multiple downstream dataflow paths, which may concurrently execute as discussed later herein. Thus, DAG 500 may have more parallelism than the query tree of FIG. 3.

FIG. 5 shows DAG 500 as a graph instead of a tree because the output of the probe physical operator has fan out, shown as fanned-out output FO, such that two downstream gather operators N and S receive the same probe operator output. A DAG may have both of fan in and fan out as shown, and a tree cannot have both.

In an embodiment, many or most of the physical operators and hardware operators (not shown) may process columnar data instead of row-major data. For example, vector hardware such as a GPU or single instruction multiple data (SIMD) may be better suited for columnar data. Likewise, much of relational algebra focuses on particular columns such as joins, filtration, sorting, grouping, and projection. Thus, it may be necessary or beneficial to convert row-major data into columnar data.

For example, a first portion of a DAG may have row-major dataflow and a second portion may have columnar dataflow, and a conversion may be needed for data to flow between both portions. Matrix transposition as discussed above for FIG. 3 or gathering as discussed later herein may accomplish such conversion from row-major to columnar or vice versa.

In particular in the shown example, the following shown physical operators are interconnected to implement a join relational operator (not shown) as follows. Generally and as shown, an upstream build operator and a downstream probe operator cooperate to accomplish a join such as follows. Because the build and probe operators are preceded by respective upstream hash operators as shown, this is a hash join.

5.1 Example Parallelism

Because the build operator is preceded by an upstream partition operator, the build phase of shown partitioned hash table HT that is used for the hash join is horizontally partitioned for horizontal scaling for acceleration by parallelism, and the probe phase of hash table HT is not partitioned and instead serially executes as explained later herein. Here, horizontal scaling may entail distributed programing such as clustered computing and/or symmetric multiprocessing (SMP) such as with a multicore CPU. In an extreme example, the distributed programing may entail elastic horizontal scaling such as with a cloud of computers such as virtual computers.

For example, the partition operator may accept a configuration setting that indicates a degree of parallelism that the DBMS may assign based on fluctuating conditions such as an amount of idle computers, an amount of virtual computers already provisioned, or a unit price for elasticity in a public cloud. Another dynamic condition that may contribute to determining the degree of parallelism is how much of a parallelism quota is currently unused.

For example, a particular client of the DBMS may be limited to simultaneously using at most five processing cores, and two of those cores may already be allocated for another portion of DAG 500. Likewise, the DBMS may be hosted by a virtual computer that is limited to simultaneously using four GPUs. If three of those GPUs are already allocated for another client of the DBMS, then the degree of parallelism may be limited to 1 CPU+1 GPU=two.

In any case, what is shown as a single build physical operator that accepts partitioned input, shown as horizontal slices HS as explained later herein, may have multiple instances of same or different hardware operators. For example for so-called offline bulk data processing for reporting, data mining, or online analytical processing (OLAP), such as according to a cycle scavenging scheme for diverse computers such as loosely federated computers that include two blade computers and one desktop computer, the single build physical operator may have three build hardware operator instances that are one desktop hardware operator and two instances of a same blade hardware operator. Thus, horizontal scaling may be heterogenous, and dynamic decisions of offloading to diverse computers or coprocessors is encouraged. Thus, query planning and optimization herein may be highly opportunistic such as according to fluctuating workload.

Partitioning is further explained later herein. More generally, other kinds of parallelism for physical operators are as follows. Somewhat similar to a schematic diagram of an electric circuit that arranges elements in serial or parallel, DAG 500 arranges physical operators in serial or parallel. More specifically, DAG 500 is composed of parallel dataflow paths.

5.2 Example Join and Fork of Dataflow Paths

For example as shown, two parallel paths that each contain a hash operator fan into the probe operator, and another two parallel paths that each contain a gather operator fan out of fanned-out output FO of the probe operator. Because of its role as a topological junction of multiple dataflow paths, a probe operator is the matchmaking center of a join. As follows, fanned-out output FO provides join results 510 as input to gather operators N and S.

In this example, the probe operator is used to equijoin tables dept and emp whose involved primary keys dept.dept_id and emp.emp_id and foreign key emp.dept_id were loaded by table scan operators DD and ED as discussed earlier herein. Matchmaking by the probe operator may generate example join results 510 as shown. As discussed below and later herein, join results 510 contains only referential data that may be materialized or not as follows.

Although not shown, an unmaterialized embodiment of join results 510 would contain only pointers such as memory addresses or array offsets (e.g. encoding dictionary codes used as ordinals) that either point to values within columnar vectors or point to rows in row major data. For example what are shown as a pair of identifiers such as Dept1 and Emp1 in join results 510 may instead be a pair of pointers. When join results 510 is unmaterialized, gather operators N and S are indirect gathers as discussed later herein.

In a materialized embodiment as shown, join results 510 contains primary key columns of rows that were matched during matchmaking. Even though column emp.dept_id as provided by table scan operator ED is a join key, as a foreign key emp.dept_id is excluded from join results 510. In this example, each of employees Emp1-4 matched once such that join results 510 contains four pairs of primary key values from two scanned and joined tables dept and emp.

Other columns of the joined tables may be assembled downstream such as with gather operator(s) as discussed later herein. Thus even when join results 510 contains materialized primary keys, materialization is somewhat partial such that materialization of other columns is deferred by delegation to downstream gather operators N and S such as for efficiency as discussed later herein.

Depending on the embodiment, join results 510 may be contained in a buffer, batches, or a stream and may be columnar or row major as discussed elsewhere herein. Depending on the embodiment, fanned-out output FO provides same or separate copies of join results 510 as inputs to gather operators N and S. Mechanisms for conveying join results 510 may entail copying values or some kind of pointers to values such as discussed later herein with direct and indirect gathering.

In an embodiment, gather operators N and S each receives, as input, a pointer to a same buffer that contains join results 510. In a columnar embodiment, join results 510 is provided as multiple pointers that respectively point to a value vector for each column in join results 510, and those vectors need not be adjacent to each other in memory.

5.2 Example Operator Cooperation

Physical operators on separate parallel paths may execute in parallel for acceleration such as with separate hyperthreads, cores, or processors. For example, both hash operators may execute in parallel because they participate in separate dataflow paths. Physical operators that reside in a same dataflow path in the DAG are arranged in serial but may still be accelerated by pipeline parallelism such that an upstream operator processes a next row or batch of rows while a downstream operator simultaneously processes a previous row or batch.

Thus, a serial dataflow path may be divided into portions such that: each portion is a separate pipeline stage; each portion contains a subsequence of one or more physical operators; and each physical operator participates in exactly one pipeline stage. For example, the gather N, DGK, and AVG operators that are explained later herein are arranged in serial and may participate in a same pipeline. For example, a previous stage of the pipeline may contain the gather N and DGK operators, and a next stage of that pipeline may contain the AVG operator.

Both physical gather operators N and S receive same or separate copies of join results 510 as explained above. Although gather mechanisms are discussed later herein, gather results of gather operators N and S are as follows. Shown together are two mutually exclusive embodiments. One embodiment generates separate gather results 520N and 520S respectively from gather operators N and S. The other embodiment instead generates combined gather results 530 that gather operators N and S cooperatively populate.

Whether gather operator N and/or S is a direct or indirect gather depends on whether or not the input to the gather is materialized or not. As shown, gather operators N and S each has two inputs and, for both gather operators, one of the inputs is join results 510. For gather operators N and S, the other input respectively is columnar output for table scan operators DN and ES. That is, gather operators have fan in such that they accept multiple inputs from multiple respective dataflows as discussed elsewhere herein.

In this example, table scan operators DN and ES emit materialized output, but join results 510 may be materialized or not as discussed earlier herein. Thus, a gather operator may be configured to accept only materialized or unmaterialized inputs or some combination of inputs as discussed later herein. Thus, what is demonstratively presented later herein as mutually exclusive direct or indirect gathering may occur together in a same gather operator that has multiple inputs that differ in materialization.

By direct or indirect gathering as contrasted later herein, gather operator N generates gather results 520N. In either case, gather operator N populates gather results 520N with materialized data as shown. In various embodiments, gather results 520N is row major or a pair of separate value vectors. In an embodiment, the dept.dept_id column in all of join results 510 and gather results 520N and 520S are same (i.e. shared) or separate (i.e. copies) vectors. Mechanisms for populating gather results 520N and 520S are presented later herein.

As explained above, combined gather results 530 is a design alternative to the pair of separate gather results 520N and 520S such that gather operators N and S cooperatively populate combined gather results 530. Gather operators N and S respectively populate the dept.dept_name and emp.emp_sal columns in gather results 530. As shown, gather results 530 is materialized, which may be row major or columnar.

Only one of gather operators N and S populates the dept.dept_id column in gather results 530. Regardless of whether combined gather results 530 or separate gather results 520N and 520S is used, gather operators N and S may concurrently emit output because they reside on separate dataflow paths as discussed elsewhere herein.

5.3 Example Optimizations

In various embodiments, a multicolumn row set or a single column may be segmented into batches such as in-memory compression units (IMCUs) such that a next pipeline stage processes a previous IMCU while a previous pipeline stage simultaneously processes a next IMCU. Likewise, the previous stage may produce an IMCU that the next stage subsequently consumes. Batches, such as IMCUs, may operate as buffers for decoupling adjacent stages of a same pipeline. For example, adjacent stages may operate asynchronously to each other.

For example with any kind of buffering between adjacent stages, a previous stage may produce many rows or many batches while the next stage simultaneously consumes only one row or one batch due to mismatched bandwidths of the stages, which is tolerable. If a buffer overflows, execution of the upstream operator is paused until space in the buffer becomes available. For example DAG 500 may experience backpressure that propagates backward along a dataflow path, which is tolerable.

As explained earlier herein, each physical operator is executed by a corresponding hardware operator. In an embodiment of a same pipeline stage, some or all hardware operators or some or all physical operators are fused into a combined operator as discussed later herein. If two physical operators are fused into one physical operator, then their hardware operators are fused into one hardware operator, although the converse is not necessarily true such that two hardware operators may be fused even when their physical operators were not fused.

Another kind of parallel acceleration is single instruction multiple data (SIMD) for inelastic horizontal scaling. Regardless of whether or not a hardware operator is created by fusion, the hardware operator may internally use SIMD for acceleration by data parallelism as explained later herein.

Two physical operators or two hardware operators may be fused even if they are contained in implementations of different relational operators. For example in FIG. 1, any of physical operators 161-162 and/or hardware operator 161B in same implementation 131A of relational operator 131 may be fused with an operator in implementation 132B in different relational operator 132. Mechanics of fusion may be as follows.

Physical operator instances are declarative and not directly executable. In an embodiment, fusing physical operators 161-162 in same implementation 131A entails replacing the two physical operators with one combined physical operator that consists of references to physical operators 161-162. Fusing physical operators includes fusing hardware operators.

A hardware operator comprises execution constructs such as a call stack frame, an operand stack frame, hardware registers, and/or a machine instruction sequence such as for a CPU or GPU. An input may be fused when common to both hardware operators being fused. For example in FIG. 5, gathers N and S share a same input. Instruction sequences of operators being fused may be fused by concatenation. An optimizer may eliminate redundancies in concatenated instruction sequences. A stack frame or a register file is a lexical scope that two hardware operators may share when fused.

5.4 Example Gathering

A gather is a category of physical operators that assemble data from different sources such as different columns of a same relational table or row set or outputs of different upstream physical operators. Materialization is the purpose of a gather, especially when filtration or join results are available and unmaterialized and actual values needed for materialization are available but materialized in an incompatible form. For example as explained below, a gather may aggregate, by copying, columns that come from different materialized row sets or may copy a vertical slice having a subset of columns from one materialized row set to generate a new materialized row set. For example, projection of two columns of a same relational table that are persisted in separate columnar files may entail a gather operator. A gather operator outputs tuple(s) that each has multiple fields such as a row of an output row set.

A gather is different from a join because a join combines data that is not yet correlated, whereas a gather combines data that is already correlated despite not yet being actually stored together. A gather may supplement a join, especially after the join such as when columns are projected from join results. For example, such post-join projection is shown in FIG. 5 as two downstream gather operators N and S that fan out from the probe operator because a separate gather operator is needed for both of the shown dept_name and emp_sal columns being gathered in the shown materialization scenario for join results as discussed later herein. Direct and indirect gathers respectively are eager or deferred due to eager or deferred materialization as contrasted later herein.

5.5 Keys and Codes

In various embodiments, a recode operator is a physical operator that may decode a dictionary encoded column or may transcode a dictionary encoded column from one encoding dictionary to another encoding dictionary such as when each IMCU has its own local encoding dictionary, such as between separate local encoding dictionaries of two IMCUs and/or a global encoding dictionary that is canonical.

A dense grouping key (DGK) operator is a physical operator that generates a respective distinct unsigned integer for each distinct value in a scalar column. In an embodiment, the integer values are entirely or mostly contiguous within a value range. In an embodiment not shown, a DGK operator scales horizontally such the two computational threads may in a thread safe and asynchronous way, for respective raw values: detect whether or not a dense key was already generated for a value, detect which of both threads should generate the dense key when both respective values are identical, and detect which respective contiguous dense key each thread should generate next.

In an embodiment, the DGK operator generates dense keys as dictionary codes for an encoding dictionary being generated. In other words, the DGK operator may be the converse of the recode operator. In an embodiment, the DGK operator detects distinct values in a column. In the shown example and as follows, the DGK operator is used for grouping rows by dept_name for subsequent statistical averaging of emp_sal by averaging operator AVG that is a physical operator.

Depending on the embodiment as discussed earlier herein, gather operator N materializes the dept.dept_name column in gather results 520N or 530, either of which may be the sole input to the DGK operator. The DGK operator may assign a next sequential unsigned integer dictionary code each time the DGK operator encounters a unique value in the dept.dept_id column of input gather results 520N or 530. In this example, the DGK operator functions as a transcoder that converts input dept_id values into dense grouping key values that the DGK operator outputs.

For example, dept_id values may be sparse such as text strings or discontinuous integers. For example after filtration or joining, large and/or many gaps may arise in a previously contiguous set of distinct dept_id values. A consequence of transcoding by the DGK operator is that gaps are removed such that the DGK operator generates a contiguous output value range from a discontinuous input value range. Thus as discussed later herein, dense grouping key values may be used as array offsets.

Although not shown, output of this DGK operator has two columns that are a dense grouping key column and a dept.dept_name column. Those two columns, in row major or columnar format, are provided as a first input to the AVG operator. The AVG operator also accepts a second input that is the output of gather operator S that, depending on the embodiment as explained earlier herein, may be gather results 520S or 530.

The AVG operator has fan in because two inputs are accepted from different dataflow paths. Even though both dataflow paths may concurrently operate, they should not reorder data. Data ordering is important to the AVG operator as follows.

The AVG operator processes one row from each input at a time. That is, the AVG operator processes together one row from the DGK operator and one row from gather operator S. The AVG operator expects both rows that are processed together to belong to a same department that is either Dept1 or Dept2, even though output from the DGK operator lacks a dept.dept_id column. So long as the AVG operator receives rows of both inputs in a same ordering that rows occur in join results 510 as emitted by the probe operator, the AVG operator can rely on an implicit correlation of rows of both inputs, which is important as follows.

From the input provided from the DGK operator, the AVG operator uses a value in the dense key column as an offset into an array or list of grouping bins (not shown) that are internal parts of the AVG operator. Thus, the AVG operator detects which grouping bin should accept an emp.emp_sal value in a corresponding row from gather results 520S or 530. Operation of the particular grouping bin is as follows.

Various examples may have various grouping bin contents and behaviors. In this example, each grouping bin contains a counter and an accumulator. When a row is directed to a particular grouping bin, the counter is incremented by one, and the emp.emp_sal value is added to the accumulator for summation that is important as follows.

As explained elsewhere herein, various kinds of operators may respectively behave as streaming, blocking, or batching that is a hybrid of streaming and blocking. A gather operator may have any of those behaviors. For example, a gather operator may individually emit an output row for each input row individually processed, which is streaming.

Semantics of the AVG operator preclude streaming and batching. That is, the AVG operator is necessarily blocking, which means that the AVG operator cannot emit any output row until all input rows have been received and processed. After processing all input rows, the AVG operator, for each grouping bin, arithmetically divides the accumulator value by the counter value to calculate a respective arithmetic average for each grouping bin.

Thus in this example, averaging operator AVG calculates a respective mean salary for each department. As a blocking operator and only after calculating all averages, the AVG operator emits final results 540 as output to be accepted by the return (ret) operator as input. The ret operator may serialize final results 540 in a format that may conform to a standard such as SQL and/or ODBC and that a client may expect.

DAG 500 is discussed above in a macroscopic way that considers dataflow paths that diverge and converge by fan out and fan in to implement a query plan. As discussed above, the dataflow paths are composed of integrated sets of physical operators. The following is instead a microscopic view of how some important physical operators actually process and transfer data. The following discussion contrasts different approaches to data materialization that, without altering query semantics, may affect efficiency of DAG 500 and may affect relative placement of some physical operators within DAG 500. In other words, optimization of DAG 500 may be based on the following available design alternatives as demonstrated in FIGS. 6-9.

5.6 Eager Materialization by Direct Gather

Direct gathering entails eager materialization of data needed by other physical operator(s) that are downstream of a gather physical operator. Thus, direct gathering may also be known as eager gathering. As discussed below, eager materialization occurs within a direct gather operator such that the output of the direct gather operator contains materialized data that may need copying during propagation to downstream physical operators. Such copying may be inexpensive when a physical operator that needs the copied data is immediately downstream of the direct gather operator.

However, when the materialized data is repeatedly copied to flow through intervening physical operators that reside in a same dataflow path between the direct gather operator and a further downstream physical operator that needs the materialized data, such copying of eagerly materialized data may be expensive. Although deferred materialization by indirect gathering may increase efficiency, mechanisms of indirect gathering may be more complex as described later herein. Thus, materialization mechanisms are first discussed below based on eager materialization by direct gathering as follows.

Although FIG. 5 uses gathers after a join as discussed later herein, the following various other scenarios are variously more straightforward. Projection entails the most straightforward gathering because both projection and gathering entail little or nothing more than materialization of multiple scalar values or multiple tuple values. Gathering for projection has three scenarios of various complexity as follows. The three projection scenarios are explained for direct gathering, which requires materialized input(s) as follows. Indirect gathering accepts unmaterialized input(s) as explained later herein.

A direct gather produces or consumes only two kinds of data, which are an individual column and row-major data, either of which may be an input or output of a direct gather as follows. The sole output of any direct or indirect gather is a materialized column if the gather projects only one column. Otherwise, the gather projects multiple columns, and the sole output of the gather is materialized row-major data. Thus, the output of any gather is materialized, and materialization is the sole purpose of a gather, such as for projection as follows.

Although any gather has only one output, a gather may have one or more inputs as follows. The most straightforward gather is a direct gather that projects one column from row-major data, such as a gather operator that accepts materialized row-major data as its sole input, such as a relational table or intermediate row set. The input has a same range of row offsets as the gather output. That is, a same offset in the range correlates a row from the gather input with, depending on whether or not multiple columns are projected, a scalar value in the output column or a row in the output row set.

For example, the third row in the gather input correlates to the third scalar value or row in the gather output. Offsets into the gather input and the gather output are discussed for demonstration. For example, a streaming gather may lack offsets as discussed later herein. Even without streaming, an offset may or may not be relevant such as with a variable width value as explained later herein.

A gather operator may have multiple inputs, each of which may be row-major data or a column of scalar values. If a direct gather has only one input, it should not be a scalar column, because the output would be the same as the input and possibly with the additional inefficiency of copying the scalars from input to output as discussed later herein.

Without any configuration settings, a scalar or row from a same offset of each input is concatenated, in declaration ordering of the inputs, to generate a row at the same offset in the output. Thus, gather output is generated by copying values such as scalars and/or tuples.

As discussed later herein, copying is expensive and should be avoided or deferred when possible. Thus for efficiency, gathering should be deferred as much as possible in a dataflow, which means that a gather operator should be pushed as far downstream in a DAG of physical operators as possible. Deferred gathering is discussed later herein.

A gather operator may have a configuration setting that indicates which column(s) to project and/or in what ordering to concatenate columns. If a direct gather has row-major data as a sole input, then that configuration setting should be set, which prevents the output from being the same as the input.

Projection entails aggregating columns from same or different row sets such as a relational table. For example, projection may entail vertical partitioning (a.k.a. vertical slicing) of a subset of columns of row-major data. As explained above, gathering all columns of row-major data as a sole input is unnecessary because the output would be the same as the input. However, projecting all columns of a same relational table may need direct gathering if the columns were vertically partitioned across multiple columnar files. Thus, converting a columnar relational table into row-major data may entail direct gathering.

5.7 Parallel Gather

Gathering, such as for projection, may be serial or parallel in various embodiments as follows. With serial direct gathering, a uniprocessor such as a single core of a CPU, for each offset in that range and one at a time by iteration, copies the value at the current offset from input vectors into a same row in the output row set at the same offset. Any input of the direct gather may be compound such as a materialized input row set. For example, a gather may accomplish decoration such that each row of the input row set becomes decorated with a corresponding value from the other input of the gather. Thus, the output of a gather may be wider than either input of the gather.

Inelastic horizontal scaling may entail single instruction multiple data (SIMD) in a sequence of strides. Each stride concurrently processes a batch that has a fixed-size contiguous subset of offsets in the range of offsets, such as a stride that concurrently combines eight values from one scalar input vector of many values with eight respective values from another scalar input vector to concurrently generate eight rows in the output row set.

Although both scale horizontally such as for gathering, SIMD strides are not the same as horizontal partitioning that is as follows. Horizontal partitioning may be inelastic, such as with a Beowulf cluster or multicore symmetric multiprocessing (SMP), or elastic such as with a cloud of computers. A partition operator is a physical operator that divides a row set or column into equally sized subsets for concurrent respective processing, such as on separate cores, by respective instances of downstream operator(s). Horizontal partitioning, especially elastic, may entail heterogenous hardware that encourages opportunistic horizontally-scaled offloading as discussed earlier herein.

A partition operator may eventually be followed by a downstream merge operator that is a physical operator that concatenates partitioned output of upstream partitioned processing into a combined output usually for subsequent serial processing by downstream operators. Depending on the embodiment, a merge operator may or may not preserve ordering and may or may not preserve sorting. In some embodiments that preserve neither ordering nor sorting, a merge operator is unneeded, and partitions are implicitly concatenated or queued into a same input of a downstream operator.

In an embodiment, some physical operators that are not merge operators may implicitly merge output. For example, the shown build operator is multi-instance for horizontal slices HS, but the probe operator is not multi-instance because the build operator implicitly merges parallel dataflows. Whether implicitly merged or expressly merged by a merge operator, all operators are implicitly multi-instance that occur in a dataflow path between an upstream partition operator and a downstream merge.

5.8 Filtration

As discussed later herein, indirect gathering entails unmaterialized input especially when some kinds of upstream physical operators emit unmaterialized output as their sole output such as a filter operator or a join operator. A filter operator has one input and one output. The sole input of a filter operator is as follows. The input is materialized. The input may be a column of scalars or a row set. The input row set may be columnar or row-major.

The sole output of a filter operator is as follows. Depending on the embodiment, filter output is materialized or unmaterialized. If the input is a column, the output is a column. If the input is a row set, the output is a row set. If the input row set is row-major, the output row set is row-major. If the input row set is columnar, the output row set is columnar.

The most straightforward filtration example is a column to which a predicate is applied by a filter operator such as follows. The filter operator has a configuration setting that specifies the predicate. In an embodiment, a relational operator may have a compound predicate but a filter operator may not such as follows.

An embodiment may decompose a compound predicate into lesser predicates that are not compound. For example, a compound predicate such as radius IN(1,3,7)OR radius>20 may be decomposed into two or more lesser predicates that are not compound. An embodiment may use a separate instance of a same or different filter operator for each respective lesser predicate.

For example, one lesser predicate of a compound predicate may be applied to many or all input values such as rows before another lesser predicate of the same compound predicate is applied to any values. For example, some lesser predicates of a compound predicate may be applied in parallel and other lesser predicates of the same compound predicate may be serially applied or pipelined such as according to whether a lesser predicate is conjunctive or disjunctive.

A predicate only uses column(s) that are part of the sole input of the filter operator. In an embodiment, a compound predicate is decomposed into lesser predicates that may each still be compound, but each lesser predicate uses only one respective column.

If filtration is based on copying, then the output is materialized as follows. Otherwise, the output is unmaterialized as discussed later herein. A copying filter operates as follows.

Unlike a gather operator and whether copying or not, the sole output of a filter operator may have same or fewer offsets than the sole input. For example, some input values, whether row or scalar, might not satisfy the predicate, in which case those values are excluded from the output. Values that satisfy the predicate are included in the output. Copying filtration copies satisfactory values from input to materialized output.

5.9 Other Physical Operators

Various embodiments have various categories of operators such as a filter operator, and there may be multiple kinds or subtypes of operators in a same category. For example, there may be many kinds of filter operators that are specialized for various scenarios. An example embodiment may have the following exotic example physical operator types, some of which are shown in FIG. 5 and discussed elsewhere herein.

Decompress—decompress the compressed data
Decode—decode the encoded data
Filter—apply a single table predicate
Project—project out entries based on filtered result
Transpose—convert between columnar data and row-based data
Gather—randomly gathering data from either columnar/row-based data with an array of index/pointer, including Direct Gather and Indirect Gather
Hash—hashing the data, works on single column or compound (multiple columns)
Partition—partition input data based on partition key to multiple partitions
Build—insert data into a hash table
Probe—find matches of input data in a hash table
Dense Key—for any given sparse input data such as text, densify to make the value range to unsigned integers [0 . . . n]
Grouped Aggregate—given an array of Dense Key and input data (e.g. column) for aggregation, compute the aggregates
Sort—sorting the input data
Sort-Merge—given multiple sorted input data streams, have the output as merged single sorted stream
Merge-Join—given sorted data in two joining tables, produce the join result using merging method
Search—search a given string of keyword Thus, a rich mix of processing activities may be included in a hardware-neutral DAG of physical operators to represent any particular query. Thus, Turing completeness of SQL and scripted SQL such as Procedural Language for SQL (PL/SQL) is preserved when compiling a query into a DAG of physical operators.

6.0 Example Join Planning

Figure 6:
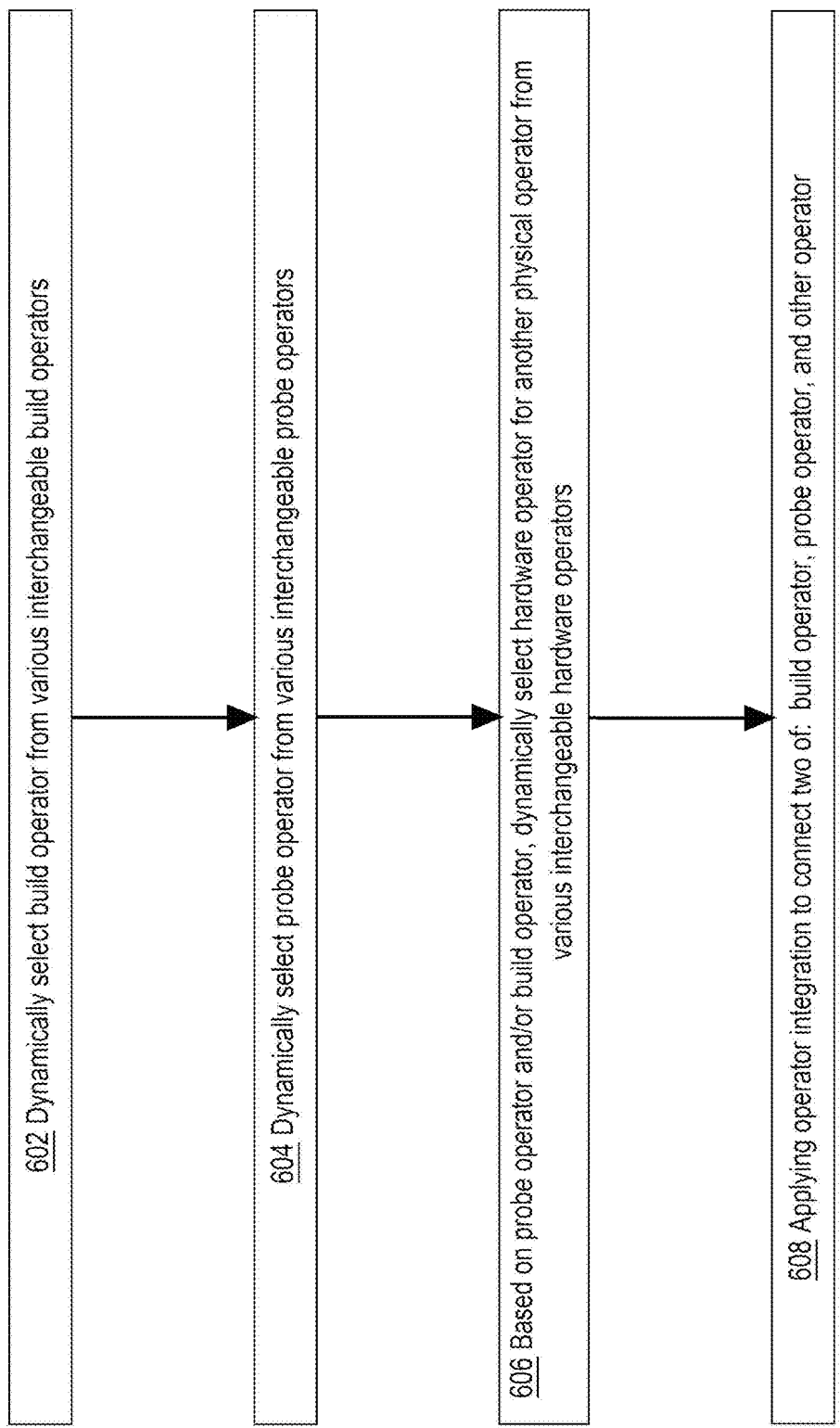
FIG. 6 is a flow diagram that depicts an example process that a DBMS may use to plan and optimize a dataflow that includes a hash table such as for a hash join.
Figure 7:
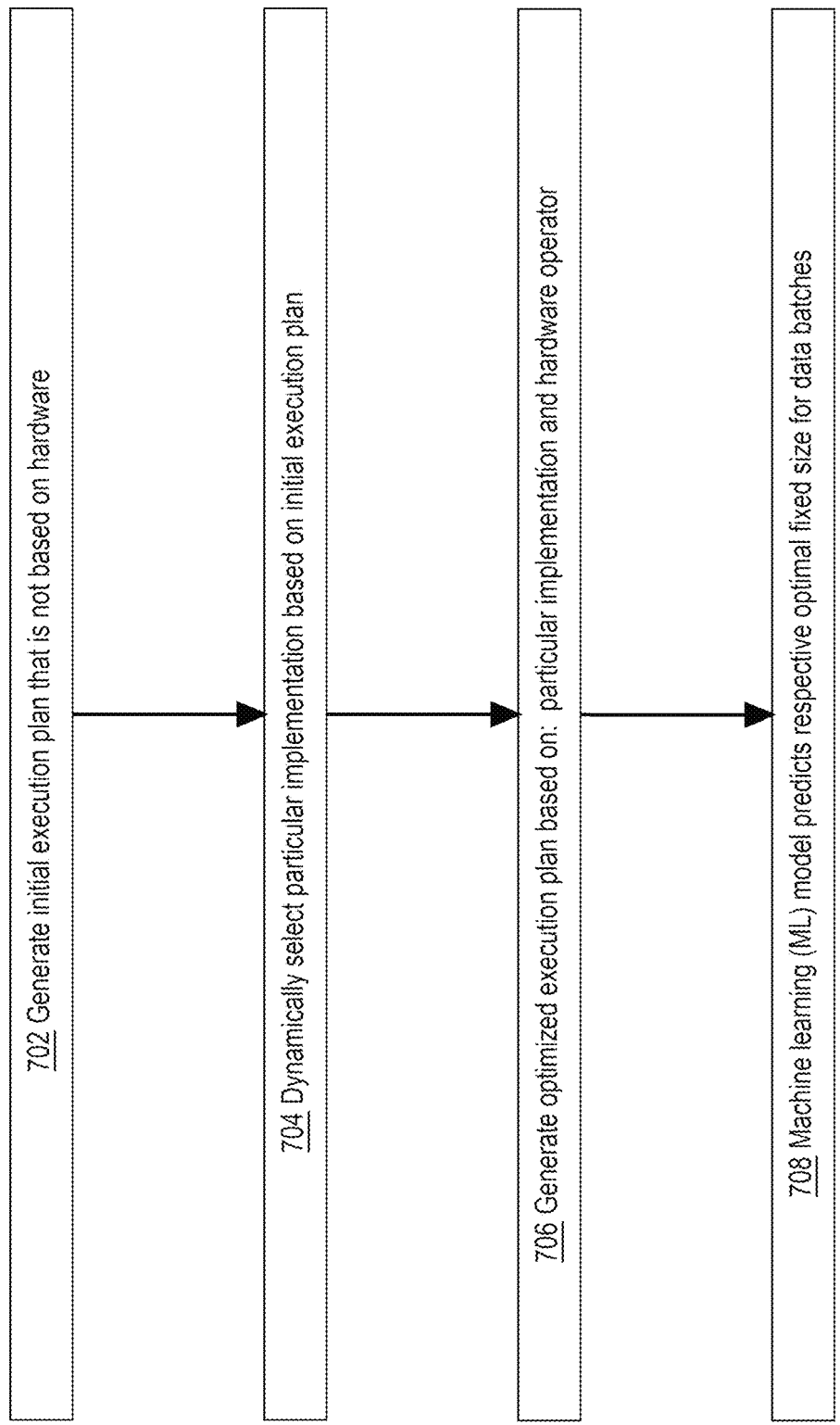
FIG. 7 is a flow diagram that depicts an example DAG optimization process that a DBMS may use to plan, optimize, and execute a DAG of physical operators and/or a DAG of hardware operators such as for execution of a data access request.

As follows, FIGS. 6-7 show example activities for planning and optimizing of a query. FIG. 6 shows example configuring activities for construction and use of a hash table to demonstrate both of: integration patterns for coupling operators generally, and arrangement of particular operators for hash table processing. FIG. 7 has a higher-level view of planning and optimization. In other words, FIG. 6 has a microscopic view of a few operators as follows, and FIG. 7 has a macroscopic view of configuring an entire DAG.

FIG. 6 is a flow diagram that depicts an example process that DBMS 100 of FIG. 1 may use to plan and optimize a dataflow that includes a hash table such as for a hash join as shown in FIG. 5 or other binning or grouping. FIG. 6 is discussed with reference to FIG. 5. As follows, FIG. 6 includes six operators (not shown), which may all be physical operators or may all be hardware operators, unless described otherwise.

As discussed earlier herein, FIG. 5 shows a hash join based on shown hash table HT that is populated during a build phase by the shown build operator and subsequently used during a probe phase by the shown probe operator. Selection and optimization of the build operator and probe operator may occur as follows.

Step 602 dynamically selects the build operator from various interchangeable build operators. Step 604 dynamically selects the probe operator from various interchangeable probe operators. Thus, hash table processing may be dynamically configured such as according to fluctuating conditions.

For example, step 602 and/or step 604 may select different operators for separate executions of a repeatedly submitted same query because a same query may not always have a same optimum plan even on same DBMS 100. Such flexibility and variation is increased beyond known relational operator planning because FIG. 6 involves physical operators or hardware operators that are finer grained than known relational operators.

Based on the selected probe operator and/or build operator, step 606 dynamically selects a hardware operator for another physical operator from various interchangeable hardware operators. For example in FIG. 5, which hardware operator or physical operator is selected for the shown partition operator and/or DGK operator may depend on which hardware operator or physical operator are chosen for the shown build operator and/or probe operator. For example, details selected for the build operator and/or probe operator, such as data formatting and referencing as discussed elsewhere herein, may restrict or benefit the partition operator and/or DGK operator. For example, if the physical operator or hardware operator that is selected for the build operator does not accommodate null as a build key value, then selection of some surrounding physical operator(s) or hardware operator(s) may be further specialized and/or optimized based on excluding null.

As shown in FIG. 5, the build operator and probe operator are connected. The build operator is also connected to a partition operator, and the probe operator is also connected to a hash operator and gather operators N and S. That is four operators and the build operator and the probe operator that are interconnected as a portion of DAG 500. The four operators may instead or additionally include other operators in other examples such as the following other example operators.

a join key decoder operator,
a decompression operator,
a dictionary encoder operator,
a dense grouping key operator that can generate a sequence of distinct unsigned integers that contains a gap,
a statistical average operator,
a filter operator that applies a simple predicate,
a sort operator,
a merge operator that preserves ordering of multiple sorted inputs,
a text search operator,
a horizontal row partitioning operator that uses a join key,
a build key insertion operator that uses a bucket of a hash table, or
an insertion overflow operator that uses a bucket of a hash table.

The build operator or the probe operator and one of the other four operators are connected by step 608 according to an operator integration pattern such as data batching and/or buffering, execution pipelining, and/or synchronous (a.k.a. blocking) or asynchronous coupling. For example in an embodiment, the following physical operators shown in FIG. 5 may engage the following example operator integration patterns and performance concerns.

Recoded and Hash: this is a fusible operator, and compute bounded
Partition: this is caching type operator, and will consume space for shown horizontal slices HS, and is bandwidth bounded.
Build, this is blocking operator, and bandwidth bounded, and generates shown hash table HT.
Probe, Gather: these are pipelining operators, and are bandwidth bounded.
DGK: this is a blocking operator, and bandwidth bounded.
AVG: this is pipelining operator, and compute bounded.

Thus, DAG 500 is configured to load balance across heterogenous hardware such as with offloading and across the DAG of physical operators that may be arranged in parallel dataflow paths and pipeline stages with a mix of somewhat mismatched bandwidths without performance bottlenecks arising within DAG 500 and without degrading the throughput of execution of DAG 500.

7.0 Example Plan Optimization Process

Presented later herein are techniques and figures for indirect gathering that may be more or less foundational to minimizing data in motion by deferring gathering. The following are other important optimizations that are generally applicable to a directed acyclic dataflow graph such as DAG 500 of FIG. 5. Query planning and execution may entail a DAG of physical operators and/or a DAG of hardware operators such as follows.

FIG. 7 is a flow diagram that depicts an example DAG optimization process that DBMS 100 of FIG. 1 may use to plan, optimize, and execute DAG 500 of physical operators and/or a DAG of hardware operators such as for execution of data access request 110. FIG. 7 is discussed with reference to FIG. 1.

For demonstration, query planning may be regarded as a linear process that generates, in the following ordering, the following artifacts in sequence such that a next artifact is generated based on the previous artifact: a) a parse tree of data access request 110 that may be an initial query plan composed of relational operators such as 131-132 and is independent of hardware, b) an implementation query plan that is independent of hardware and based on dynamically selected particular implementations such as 131A and 132B for the relational operators and include physical operators such as 161-162 that are hardware independent and arranged in a DAG of physical operators, and c) a corresponding optimized DAG of hardware operators that execute on heterogenous hardware on behalf of the DAG of physical operators.

In practice an embodiment of DBMS 100 may have various approaches that may deviate in various ways from such a rigid linear progression of planning and execution artifacts. For example instead of a waterfall approach, planning and optimization may be an iterative approach in which a previously generated artifact may be revised or replaced based on a subsequently generated artifact. For example, a DAG of hardware operators is generated based on a DAG of physical operators that may need or benefit from subsequent revising or replacement based on selection, fusion, and topological reordering of hardware operators in the DAG of hardware operators.

For example, implementation 131B may be initially unselected as shown due to initial costing. However, when selected implementation 131A is tailored for hardware by selection, fusion, and reordering of hardware operators, a final cost of implementation 131A may be higher than expected. For example such as due to dynamic conditions, some hardware, hardware operators, fusions, or other optimizations may be unexpectedly unavailable.

Thus, there may be feedback between phases of planning and optimization that causes revision or replacement of previously generated artifact(s) such as according to a feedback loop in which estimated costs are revised with increasing accuracy. For example, an optimization iteration may reveal that implementation 131B actually and unexpectedly costs less than previously selected implementation 131A.

In operation, step 702 generates an initial execution plan that is not based on accurate hardware details such as an initial tree of relational operators 131-132 based on initial costing that may, for example, mistakenly presume: pessimistically that no GPUs are present or optimistically that all GPUs are idle. Such initial presumptions, although potentially inaccurate, may expedite initial planning and may actually be statistically accurate, reliable, and robust in many or most cases.

Step 704 initially and dynamically selects implementations 131A and 132B for respective relational operators 131-132. When selected individually and in isolation from each other, implementations 131A and 132B may seem independently optimal. However, there may be inter-operator concerns that span between selected implementations 131A and 132B that might be better optimized if implementation 131B and/or 132A were instead selected. For example even though implementation 131A may initially cost less than implementation 131B, DBMS 100 may detect during iterative planning and optimization that physical operator 164 of implementation 131B of relational operator 131 has more synergy such as less resource consumption for inter-operation with the planning artifacts of relational operator 132 than does physical operator 162 of initially selected implementation 131A.

Thus, step 706 may iteratively generate an optimized execution plan that is based on, by revision or replacement, a particular initially selected or unselected implementation of a relational operator, such as based on initially selected or unselected hardware operators such as before or after fusion or reordering of physical operators or hardware operators. Iteration of planning and optimization eventually converges on a final DAG of physical operators and a final DAG of hardware operators according to convergence criteria that may favor hasty optimization with fewer iterations for inexpensive queries, such as according to row count and/or value distributions such as cardinality, and may favor many iterations for prolonged optimization of expensive queries such as with an immense data warehouse.

As discussed above, steps 702, 704, and 706 perform query plan formulation such as topological formulation and reformulation of a DAG such as by fusion, reordering, and/or substitution of operators. However even after iteration converges on a final plan, the plan and/or its operators may have configuration settings that may benefit from additional tuning. For example, input or output of a physical operator or a hardware operator may entail a buffer of a configurable capacity, and optimal capacity may depend on dynamic conditions such as interconnectivity of operators, fusion of operators, separation of subsets of operators into pipeline stages, details of participating hardware, and/or details of payload data such as volume and datatypes.

DBMS 100 may contain a machine learning (ML) model that, in step 708, predicts optimal configuration settings such as for tuning respective optimal fixed sizes for data batches and buffers of various instances of various operators in various positions in a DAG. Predictions by the ML model are based on inputs known as features that may include details of the DAG, the DAG's operators and their interconnectivity, participating hardware, fluctuating resource availability, and/or statistics of payload data.

Depending on the nature of a particular configuration setting, such as numeric or categorical, various kinds of ML models may be more or less suitable for providing predictions. As discussed later herein, example kinds of ML models include a decision tree, a random forest, an artificial neural network (ANN) such as a multilayer perceptron (MLP), a linear or logistic regressor, and a support vector machine (SVM). Reinforcement learning during offline training with historical operational information of DBMS(s) such as DBMS 100 may prepare the ML model to make highly accurate predictions of optimality in a live production setting such as discussed later herein. Step 708 adds entirely or mostly insignificant latency and can substantially accelerate subsequent execution of a DAG. After step 708, the DAG of hardware operators is both optimal and ready to directly execute.

8.0 Deferred Materialization by Indirect Gather

As discussed earlier herein, eager materialization by direct gathering may entail excessive copying of materialized data to physical operators that may be much further downstream from the direct gather operator, which may be inefficient. Deferred materialization by indirect gathering may increase efficiency in innovative ways as discussed below. Indirect gathering may also be known as deferred gathering because the gathering may be deferred by placing the indirect gather operator as far downstream as possible such as adjacent to a far downstream physical operator that needs materialized data. Reduced payload copying by such topological optimization is discussed later herein.

The probe operator of FIG. 5 performs matchmaking between the two tables but does not actually concatenate matching rows to materialize join results. Instead the probe operator merely emits unmaterialized join results that consist of pairs of references to matched rows of both tables such as with row identifiers, memory address pointers, or buffer internal offsets. The probe operator does not emit any table columns, not even primary key columns.

Such column projection for materialization of join results is delegated to downstream gather operator(s). When two columns come from a same relational table or a same materialized row set, then both columns may be gathered by a single gather operator, even if the gather operator is downstream of a join such as downstream of the probe operator. However, when both columns come from separate relational tables as with the dept_name and emp_sal columns that respectively come from the dept and emp tables of FIG. 3, then gathering both columns requires two gather operators N and S as shown in FIG. 5. In an embodiment, both gather operators N and S execute in parallel such as discussed earlier herein.

An important innovation of techniques herein is minimization of actual dataflow (so-called data in motion or in flight), including minimization of occurrences and scope of data copying. Thus, direct gathering may be discouraged due to excessive copying, especially when either input is wide such as having multiple fields or having one wide field such as text. Herein, indirection can minimize copying by transferring references, such as row identifiers instead of actual values such as multifield tuples, within the dataflow of a DAG of physical operators. Likewise, a direct gather can only be used if all values to be copied to the gather's output are directly provided in some input of the direct gather.

For example, a direct gather cannot be used with unmaterialized inputs such as join results as explained above. That restriction may necessitate copying of values into input vectors for the direct gather, which is usually suboptimal and usually the reason not to use a direct gather. Thus, the following kinds of indirect gathers may often be more efficient in time and/or space than a direct gather. Another benefit of indirect gathers is that, because they expect unmaterialized input(s) such as produced by a join, an indirect gather complements the join as discussed above.

Figure 8:
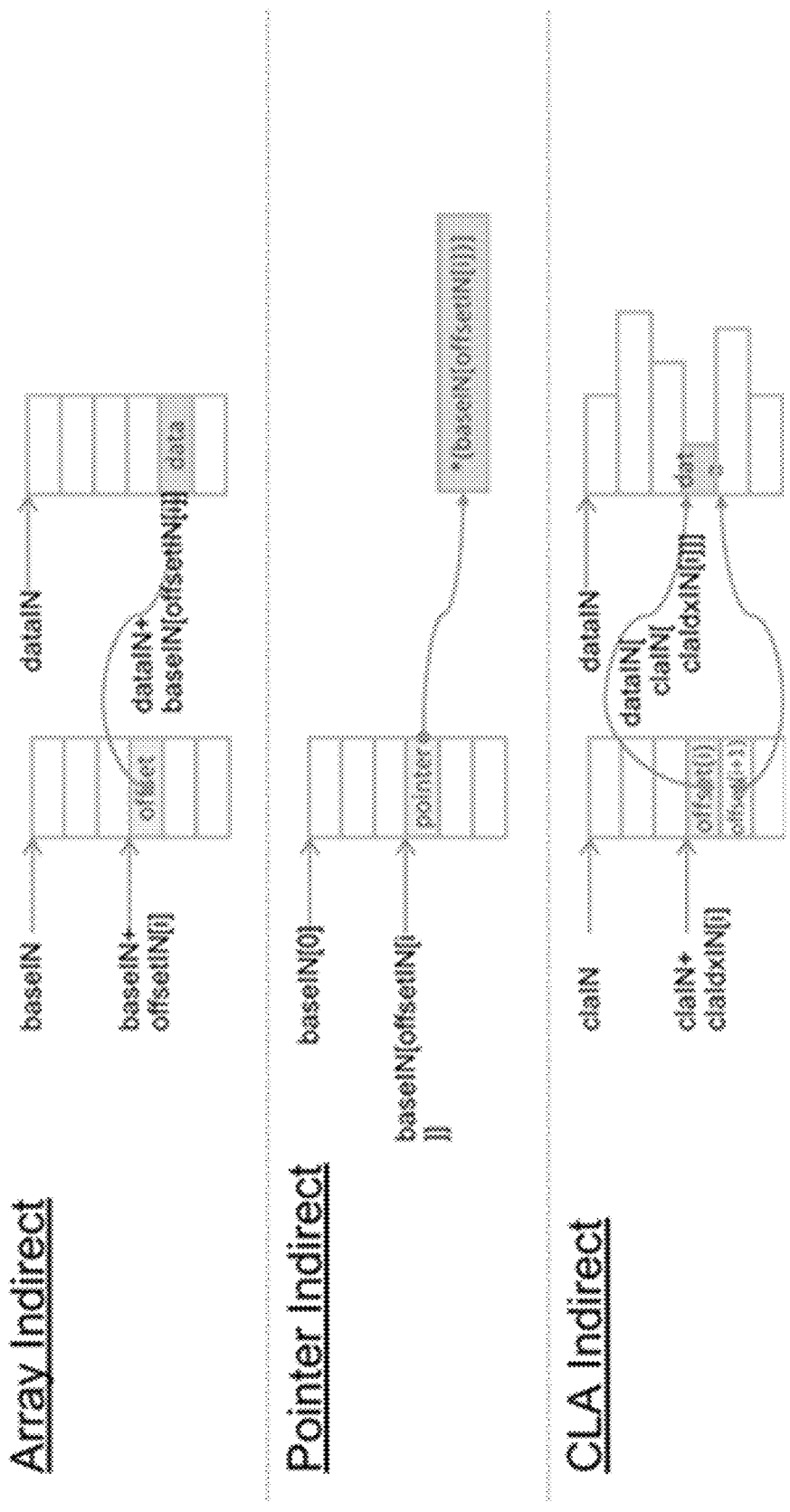
FIG. 8 is a block diagram that depicts three kinds of indirect gathers that are specialized for respective scenarios.

FIG. 8 is a block diagram that depicts three kinds of indirect gathers that are specialized for respective scenarios as follows. Unmaterialized data such as the output of a filter operator or a relational join as discussed earlier herein may be provided as input to a downstream indirect gather and that may indicate a subset of rows in a row set that were already evaluated as satisfying a filter.

As shown, the three kinds of indirect gather use double indirection, such that dereferencing one reference obtains another reference which must subsequently be dereferenced to reach an actual row of a row set. Thus two buffers, such as two separate inputs to a same indirect gather operator, are used such that the first buffer contains references into the second buffer as shown and as explained below. Such double indirection can preserve already applied filtration such as follows.

In other words, the second buffer may contain all source rows, and the first buffer may contain references to the subset of rows that satisfy the filter. Thus, the first buffer may have fewer and narrower entries than the second buffer. Thus, using the first buffer as an additional buffer for double indirection does not consume significant additional memory.

The shown array indirect and CLA indirect examples have two buffers for double indirection, such that the first buffer is shown on the left, and the second buffer is shown on the right. The pointer indirect example may or, as shown, may not have a second buffer. For the array indirect and CLA indirect examples, the second buffer keeps the rows of the original row set consolidated in contiguous memory. As shown, dataIN points to the second buffer that may be a segment as discussed below.

Because the first buffer of the pointer indirect example contains pointers instead of offsets, those pointers may point anywhere in the address space for completely random access, such that rows of the row set need not be contiguously stored. Thus, the pointer indirect example does not need a second buffer to provide the rows of the row set. Although having a second buffer would not interfere with pointer indirection, pointers are wider than offsets, and thus pointer indirection usually would be used only when a second buffer is absent.

As follows and as discussed later herein, indirect gathering accommodates segmented input such as when an input is: a) too big to allocate contiguous memory, b) segmented according to a special scheme such as IMCUs such as for batching or caching, and/or c) partitioned into horizontal slices as discussed earlier herein such as with an upstream partition operator. Such segmentation may require an indirect gather to maintain a pointer to which segment is currently being processed by the gather, shown as dataIN, and which references correspond to that segment, shown as baseIN or claIN. Those corresponding references may be processed as follows.

The current segment is processed as a contiguous array of references that may be individually accessed such as by iteration such as according to shown variable i. For example, baseIN[i] may randomly access one reference in the first array, shown as offset or pointer, which can be used to randomly access actual data in the second array.

In all three of the example indirect gathers, the first array contains references of a same respective fixed width. The second array of an array indirect contains data of fixed width such that the shown offset is used as an array index into the second array. The shown pointer of a pointer indirect may point to data that is fixed width or whose variable width is self-described by a null terminator or length counter.

Another way to indirectly gather variable-width data is with a cumulative length array (CLA) that contiguously packs variable-width data that is not self-delimiting. A CLA indirect needs two byte-offsets to access one datum in the second array as shown. In the first array, shown offset[i] is a byte-offset that indicates at how many bytes after the start of the second buffer does a given datum begin. In the first array, shown offset[i+1] is a byte-offset that indicates at how many bytes after the start of the second buffer does a next contiguous datum begin. Thus, the variable-width given datum is bounded in the second array by both of those byte offsets.

FIG. 8 is a block diagram that depicts three kinds of indirect gathers that are specialized for respective scenarios as follows. Unmaterialized data such as the output of a filter operator or a relational join as discussed earlier herein may be provided as input to a downstream indirect gather and that may indicate a subset of rows in a row set that were already evaluated as satisfying a filter.

9.0 Segmented Gather

Figure 9:
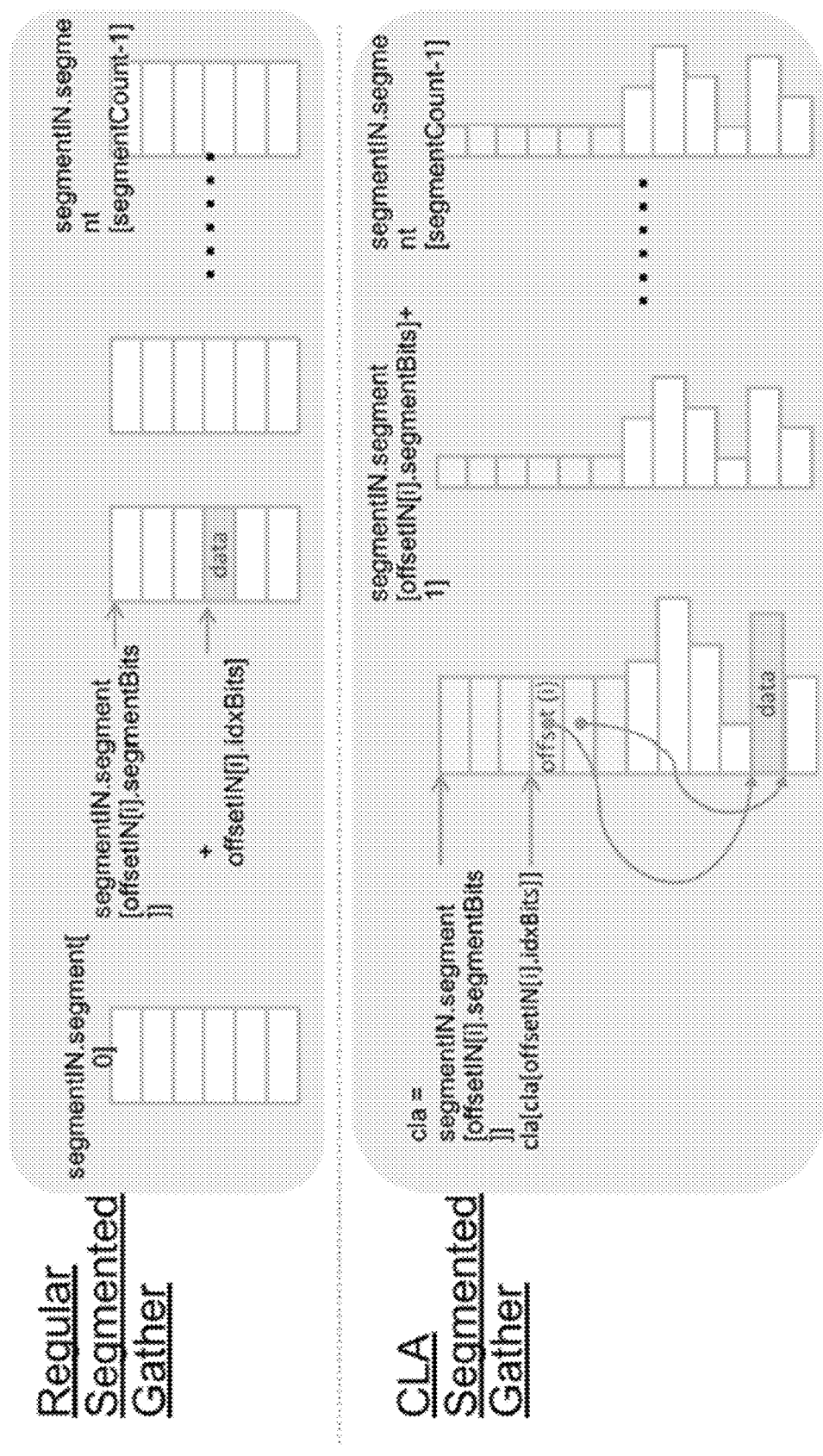
FIG. 9 is a block diagram that depicts two kinds of segmented gathers.

FIG. 9 is a block diagram that depicts two kinds of segmented gathers. FIG. 9 is discussed with reference to FIG. 8. As shown, the regular segmented gather of FIG. 9 is as discussed above for FIG. 8, where a data segment is the second input buffer, and corresponding references into the second input buffer are stored in the first input buffer, such that a regular segmented gather operator accepts the first and second buffers as separate inputs.

FIG. 9 also shows a CLA segmented gather that has only one input, which is self-delimiting even though its variable width data is not self-delimiting. That is as shown, the first and second buffers are concatenated into a single self-delimiting input buffer as shown.

10.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server.

A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

10.1 Query Processing

A query is an expression, command, or set of commands that, when executed, causes a server to perform one or more operations on a set of data. A query may specify source data object(s), such as table(s), column(s), view(s), or snapshot (s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
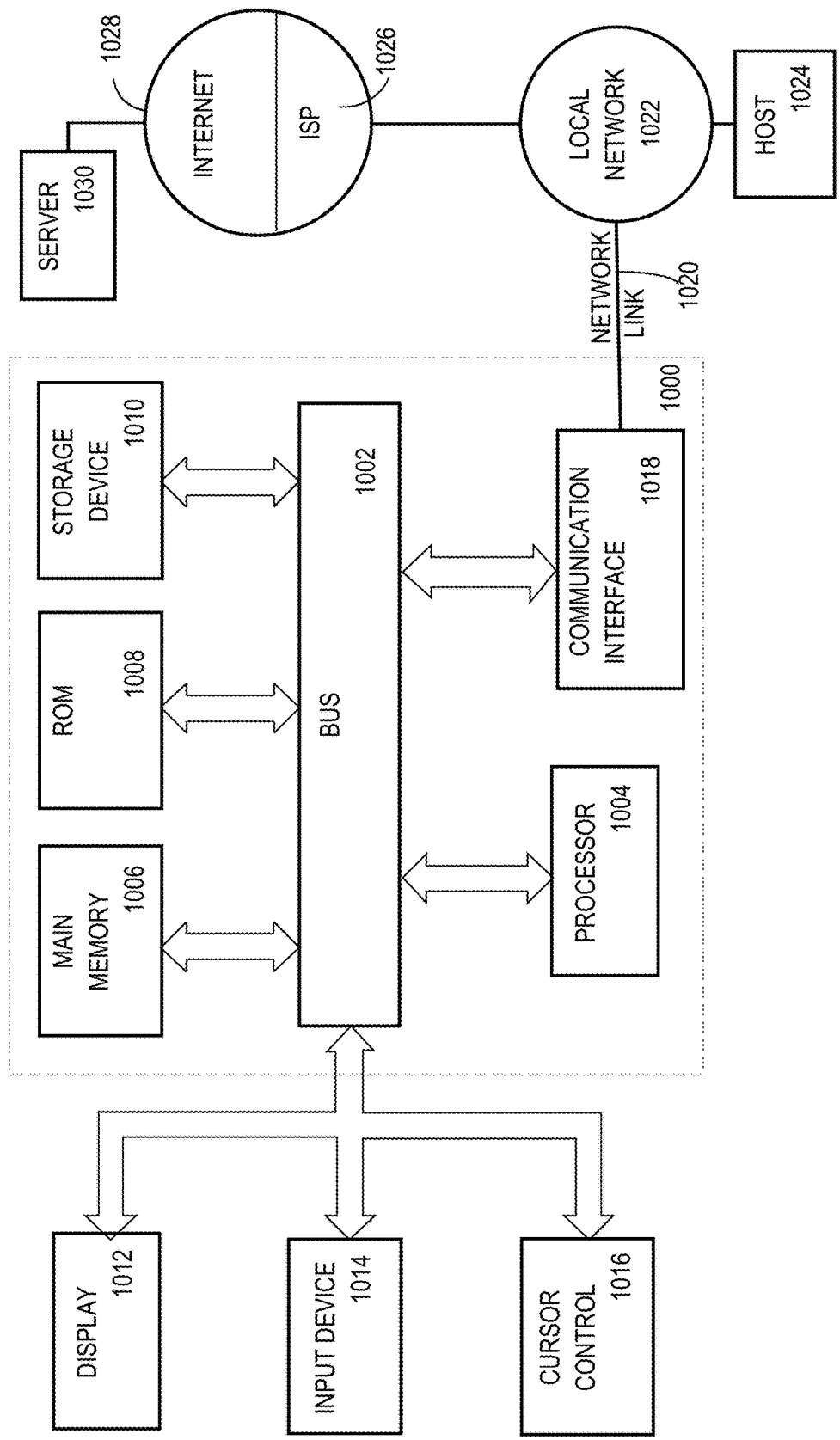
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Software Overview

Figure 11:
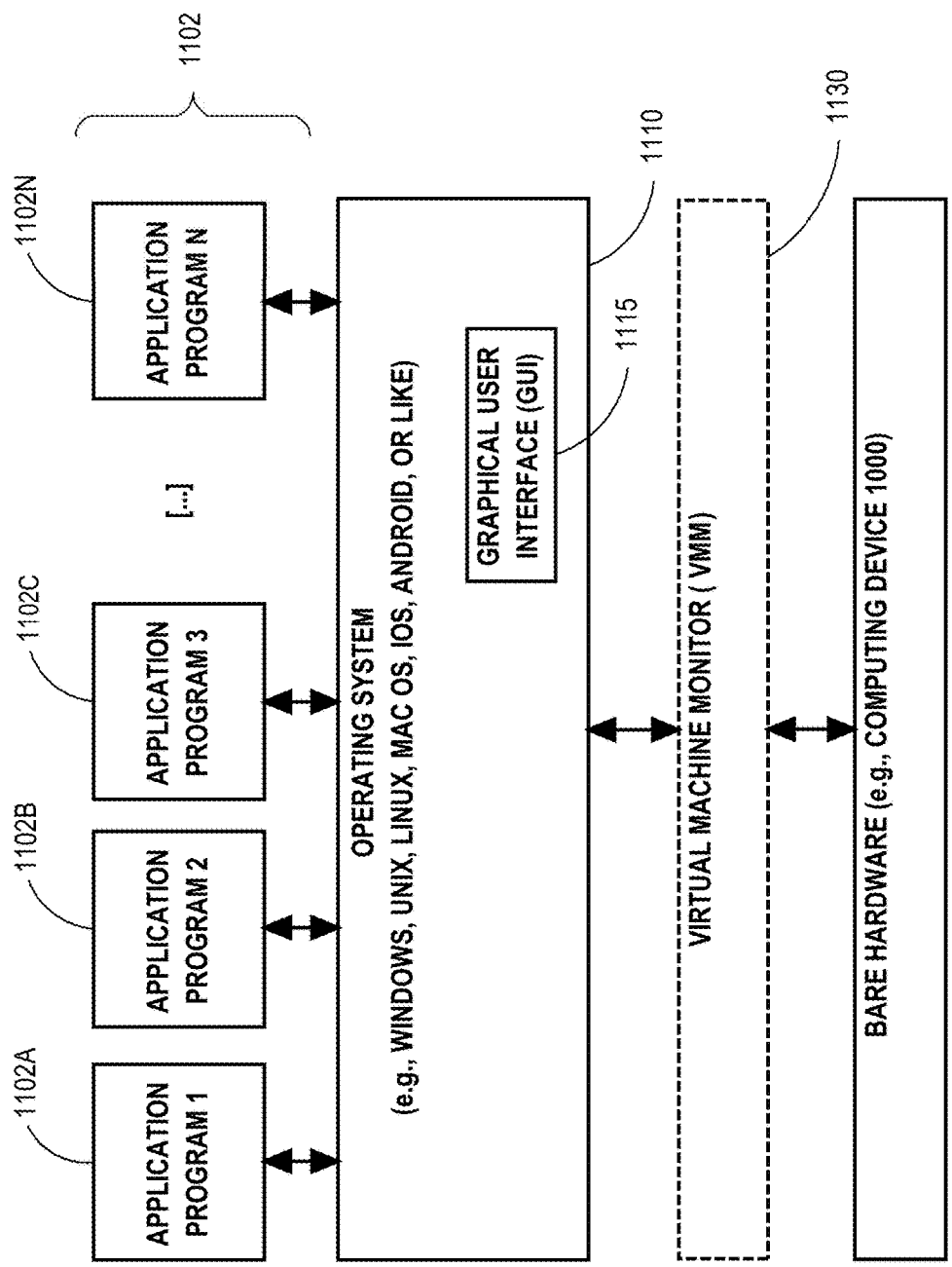
FIG. 11 is a block diagram that illustrates a basic software system that may be employed for controlling the operation of a computing system.

FIG. 11 is a block diagram of a basic software system 1100 that may be employed for controlling the operation of computing system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing system 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1100 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a data access request for a plurality of tuples;
   compiling the data access request into one or more relational operators;
   dynamically selecting a particular implementation of a particular relational operator of said one or more relational operators from a plurality of interchangeable implementations, wherein each implementation of the plurality of interchangeable implementations comprises a respective one or more physical operators;
   dynamically selecting a particular hardware operator for a particular physical operator of said one or more physical operators of the particular implementation of the particular relational operator from a plurality of interchangeable hardware operators that comprises: a first hardware operator that executes on first processing hardware, and a second hardware operator that executes on second processing hardware that is functionally different from the first processing hardware, wherein said dynamically selecting said particular implementation is based on a dynamic condition selected from the group consisting of:
   a) available memory,
   b) available processing bandwidth, and
   c) expected consumption of memory or processing time by one selected from the group consisting of: said particular implementation, said particular physical operator, and said particular hardware operator; generating an execution plan for the data access request that is a directed acyclic graph (DAG), wherein:
   the DAG is not a tree, and
   the DAG comprises said one or more physical operators of the particular implementation of said particular relational operator; interpreting or otherwise executing the generated execution plan; and
   generating a response to the data access request that is based on: the plurality of tuples, the particular implementation of the particular relational operator, and the particular hardware operator, wherein the response is an answer to the data access request that includes a final result set.

2. The method of claim 1 wherein:
   the method further comprises transferring, to or from the particular hardware operator, columnar data;
   said transferring the columnar data is based on pipeline parallelism and one selected from the group consisting of: asynchrony and data batches.

3. The method of claim 2 further comprising a machine learning (ML) model predicting an optimal fixed size for said data batches.

4. The method of claim 1 wherein:
   said compiling the data access request comprises generating an initial execution plan for the data access request that is not based on processing hardware;
   said dynamically selecting said particular implementation is based on the initial execution plan;
   the generating said execution plan for the data access request is based on: said particular implementation of the particular relational operator, and said particular hardware operator.

5. The method of claim 1 further comprising:
   detecting whether said particular hardware operator and a second hardware operator, for a same or different relational operator as the particular hardware operator, can be fused into a combined hardware operator, and
   fusing, into a same lexical scope and based on said detecting, said particular hardware operator and the second hardware operator into said combined hardware operator.

6. The method of claim 1 wherein:
   said plurality of tuples contains a column;
   the method further comprises:
   transferring, from said particular physical operator to a specific physical operator that is a gather operator, particular data that is: based on said plurality of tuples and not based on said column; and
   combining, by the gather operator, said column with said particular data.

7. The method of claim 6 wherein:
   said plurality of interchangeable implementations comprises a second implementation that comprises a second physical operator that is a second gather operator that is different from said gather operator;
   each of said gather operator and said second gather operator is selected from the group consisting of:
   a direct gather that copies row identifiers,
   a direct gather that does not use row identifiers,
   an indirect gather that dereferences row identifiers, and
   a segmented gather that can process a segmented array.

8. The method of claim 7 wherein a segment of the segmented array contains:
   data values and references to said data values.

9. The method of claim 7 further comprising dynamically selecting said indirect gather from at least two of the group consisting of:
   a gather that reads an array of data,
   a gather that dereferences multiple memory pointers, and
   a doubly indirect gather.

10. The method of claim 1 wherein:
    said plurality of tuples comprises build data rows and probe data rows;
    said data access request requires a relational join of the build data rows with the probe data rows;

said dynamically selecting a particular implementation comprises:
  dynamically selecting a first physical operator that is a build operator from a plurality of interchangeable build operators, and
  dynamically selecting a second physical operator that is a probe operator from a plurality of interchangeable probe operators.

11. The method of claim 10 wherein:
said particular physical operator comprises one selected from the group consisting of the build operator and the probe operator;
a third physical operator comprises one selected from the group consisting of:
  a join key decoder operator,
  a decompression operator,
  a dictionary encoder operator,
  a dense grouping key operator than can generate a sequence that contains a gap,
  a statistical mean operator,
  a filter operator that applies a simple predicate,
  a sort operator,
  a merge operator that preserves ordering of multiple sorted inputs,
  a text search operator,
  a horizontal row partitioning operator that uses a join key,
  a build key insertion operator that uses a bucket of a hash table, and
  an insertion overflow operator that uses a bucket of a hash table;
the method further comprises dynamically selecting, based on said particular physical operator, a specific hardware operator for the third physical operator from a second plurality of interchangeable hardware operators.

12. The method of claim 11 wherein:
an operator integration comprises one selected from the group consisting of:
  fusing into a combined operator, and
  asynchronous pipelining;
the method further comprises applying the operator integration to connect two selected from the group consisting of: the build operator, the probe operator, and the third physical operator.

13. The method of claim 1 wherein said first processing hardware is one selected from the group consisting of:
  a single instruction multiple data (SIMD) processor,
  a graphical processing unit (GPU),
  a field array programmable gate array (FPGA),
  a direct access (DAX) coprocessor, and
  an application specific integrated circuit (ASIC) that contains pipeline parallelism.

14. One or more non-transitory computer-readable storage media storing instructions that, when executed by one or more processors, cause:
  receiving a data access request for a plurality of tuples;
  compiling the data access request into one or more relational operators;
  dynamically selecting a particular implementation of a particular relational operator of said one or more relational operators from a plurality of interchangeable implementations, wherein each implementation of the plurality of interchangeable implementations comprises a respective one or more physical operators;
  dynamically selecting a particular hardware operator for a particular physical operator of said one or more physical operators of the particular implementation of the particular relational operator from a plurality of interchangeable hardware operators that comprises: a first hardware operator that executes on first processing hardware, and a second hardware operator that executes on second processing hardware that is functionally different from the first processing hardware, wherein said dynamically selecting said particular implementation is based on a dynamic condition selected from the group consisting of:
    a) available memory,
    b) available processing bandwidth, and
    c) expected consumption of memory or processing time by one selected from the group consisting of: said particular implementation, said particular physical operator, and said particular hardware operator;
  generating an execution plan for the data access request that is a directed acyclic graph (DAG), wherein:
    the DAG is not a tree, and
    the DAG comprises said one or more physical operators of the particular implementation of said particular relational operator;
  interpreting or otherwise executing the generated execution plan; and
  generating a response to the data access request that is based on: the plurality of tuples, the particular implementation of the particular relational operator, and the particular hardware operator, wherein the response is an answer to the data access request that includes a final result set.

15. The one or more non-transitory computer-readable storage media of claim 14 wherein:
  the instructions further cause transferring, to or from the particular hardware operator, columnar data;
  said transferring the columnar data is based on pipeline parallelism and one selected from the group consisting of: asynchrony and data batches.

16. The one or more non-transitory computer-readable storage media of claim 14 wherein:
  said plurality of tuples contains a column;
  the instructions further cause:
    transferring, from said particular physical operator to a specific physical operator that is a gather operator, particular data that is: based on said plurality of tuples and not based on said column; and
    combining, by the gather operator, said column with said particular data.

17. The one or more non-transitory computer-readable storage media of claim 16 wherein said gather operator is selected from the group consisting of:
  said plurality of interchangeable implementations comprises a second implementation that comprises a second physical operator that is a second gather operator that is different from said gather operator;
  each of said gather operator and said second gather operator is selected from the group consisting of:
    a direct gather that copies row identifiers,
    a direct gather that does not use row identifiers,
    an indirect gather that dereferences row identifiers, and
    a segmented gather that can process a segmented array.

18. The one or more non-transitory computer-readable storage media of claim 14 wherein:
  said plurality of tuples comprises build data rows and probe data rows;
  said data access request requires a relational join of the build data rows with the probe data rows;
  said dynamically selecting a particular implementation comprises:

dynamically selecting a first physical operator that is a build operator from a plurality of interchangeable build operators, and dynamically selecting a second physical operator that is a probe operator from a plurality of interchangeable probe operators.

19. The one or more non-transitory computer-readable storage media of claim 18 wherein:

said particular physical operator comprises one selected from the group consisting of the build operator and the probe operator;

a third physical operator comprises one selected from the group consisting of:
- a join key decoder operator,
- a decompression operator,
- a dictionary encoder operator,
- a dense grouping key operator than can generate a sequence that contains a gap,
- a statistical mean operator,
- a filter operator that applies a simple predicate,
- a sort operator,
- a merge operator that preserves ordering of multiple sorted inputs,
- a text search operator,
- a horizontal row partitioning operator that uses a join key,
- a build key insertion operator that uses a bucket of a hash table, and
- an insertion overflow operator that uses a bucket of a hash table;

the instructions further cause dynamically selecting, based on said particular physical operator, a specific hardware operator for the third physical operator from a second plurality of interchangeable hardware operators.

* * * * *